United States Patent
Tanaka et al.

(10) Patent No.: US 8,980,987 B2
(45) Date of Patent: Mar. 17, 2015

(54) METHOD FOR PRODUCING MODIFIED CONJUGATED DIENE RUBBER, MODIFIED CONJUGATED DIENE RUBBER, AND RUBBER COMPOSITION

(75) Inventors: Ryouji Tanaka, Tokyo (JP); Naoya Nosaka, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 13/991,005

(22) PCT Filed: Nov. 28, 2011

(86) PCT No.: PCT/JP2011/077357
§ 371 (c)(1),
(2), (4) Date: May 31, 2013

(87) PCT Pub. No.: WO2012/073880
PCT Pub. Date: Jun. 7, 2012

(65) Prior Publication Data
US 2013/0245192 A1    Sep. 19, 2013

(30) Foreign Application Priority Data
Dec. 1, 2010 (JP) ................. 2010-268132

(51) Int. Cl.
| | | |
|---|---|---|
| C08K 3/34 | (2006.01) | |
| C08L 9/00 | (2006.01) | |
| C08F 36/06 | (2006.01) | |
| C08K 3/04 | (2006.01) | |
| C08K 3/36 | (2006.01) | |
| C08C 19/44 | (2006.01) | |
| C08L 9/06 | (2006.01) | |
| B60C 1/00 | (2006.01) | |
| C08C 19/30 | (2006.01) | |

(52) U.S. Cl.
CPC . *C08F 36/06* (2013.01); *C08K 3/04* (2013.01); *C08K 3/36* (2013.01); *C08C 19/44* (2013.01); *C08L 9/06* (2013.01); *B60C 1/0016* (2013.01); *Y02T 10/862* (2013.01); *C08C 19/30* (2013.01)
USPC .......................................... 524/492; 524/575

(58) Field of Classification Search
CPC .................................. C08F 36/06; C08L 9/06
USPC ............................................................ 524/492
See application file for complete search history.

(56) References Cited

U.S. PATENT DOCUMENTS

| | | |
|---|---|---|
| 2004/0254301 A1 | 12/2004 | Tsukimawashi et al. |
| 2005/0020757 A1 | 1/2005 | Ozawa et al. |
| 2005/0070672 A1 | 3/2005 | Ozawa et al. |
| 2008/0015309 A1* | 1/2008 | Ozawa et al. ................. 524/588 |
| 2008/0103261 A1 | 5/2008 | Tanaka et al. |
| 2009/0163668 A1* | 6/2009 | Yamada et al. ............ 525/331.9 |
| 2010/0016496 A1 | 1/2010 | Tanaka et al. |
| 2010/0152369 A1 | 6/2010 | Shibata et al. |
| 2010/0280173 A1 | 11/2010 | Ozawa et al. |
| 2011/0160388 A1 | 6/2011 | Tanaka et al. |
| 2012/0270997 A1 | 10/2012 | Tanaka et al. |

FOREIGN PATENT DOCUMENTS

| | | |
|---|---|---|
| EP | 2 045 272 A1 | 4/2009 |
| EP | 2 223 959 A1 | 9/2010 |
| EP | 2 492 286 A1 | 8/2012 |
| JP | 2006 137858 | 6/2006 |
| WO | 03 029299 | 4/2003 |
| WO | 03 046020 | 6/2003 |
| WO | 03 048216 | 6/2003 |
| WO | 2007 034785 | 3/2007 |
| WO | 2008 050845 | 5/2008 |
| WO | 2008 123164 | 10/2008 |
| WO | 2009 133888 | 11/2009 |
| WO | 2011 049180 | 4/2011 |

OTHER PUBLICATIONS

International Search Report Issued Feb. 21, 2012 in PCT/JP11/77357 Filed Nov. 28, 2011.
U.S. Appl. No. 13/979,522, filed Jul. 12, 2013, Tanaka.
Extended European Search Report issued Aug. 13, 2014 in European Patent Application No. 11845388.5.

* cited by examiner

*Primary Examiner* — Hui Chin
(74) *Attorney, Agent, or Firm* — Oblon, McClelland, Maier & Neustadt, L.L.P.

(57) ABSTRACT

This invention relates to a method for producing a modified conjugated diene rubber wherein the method involves: (a) a step in which a conjugated diene polymer having an alkali metal or alkaline earth metal active end and obtained by polymerizing a conjugated diene compound or by polymerizing a conjugated diene compound with an aromatic vinyl compounds is reacted with a first alkoxysilane compound which has an alkoxysilyl group having two or more alkoxy groups and has a group protected by a protecting group wherein deprotection is possible to obtain a modified conjugated-diene polymer having an alkoxysilyl group; and (b) a step in which the modified conjugated-diene polymer is reacted with a second alkoxysilane compound which has an alkoxysilyl group.

16 Claims, No Drawings

METHOD FOR PRODUCING MODIFIED CONJUGATED DIENE RUBBER, MODIFIED CONJUGATED DIENE RUBBER, AND RUBBER COMPOSITION

TECHNICAL FIELD

The present invention relates to a method for producing a modified conjugated diene rubber, a modified conjugated diene rubber and a rubber composition. More particularly, the present invention relates to a method for producing a modified conjugated diene rubber from which a crosslinked rubber excellent in terms of tensile strength, wear resistance, wet skid resistance, and low-hysteresis-loss characteristics can be produced, a modified conjugated diene rubber obtained by the production process and having excellent shape retentivity, a rubber composition which contains the modified conjugated diene rubber, and a crosslinked rubber composition (e.g., vulcanized rubber composition) obtained by crosslinking (e.g., vulcanizing) the rubber composition.

BACKGROUND ART

A conjugated diene rubber (e.g., styrene/butadiene copolymer) obtained by an emulsion polymerization method is known as a rubber for automotive tires. Under recent circumstances in which improvements in the fuel-saving performance of motor vehicles are expected, various conjugated diene rubbers which render excellent fuel-saving performance possible have been proposed.

A conjugated diolefin (co)polymer rubber characterized by (1) being a (co)polymer of a conjugated diolefin or of a conjugated diolefin and an aromatic vinyl compound, (2) having a primary amino group and an alkoxysilyl group which are bound to the (co)polymer chain, and (3) having a structure in which a monomer having a functionality of 2 or higher has been copolymerized with the (co)polymer chain and/or at least part of the (co)polymer chain has been coupled with a coupling agent having a functionality of 2 or higher has been proposed as an example (patent document 1).

As another example, a modified diene polymer rubber obtained through step 1 in which either a conjugated diene or a conjugated diene and an aromatic vinyl monomer are polymerized in a hydrocarbon solvent in the presence of an alkali metal catalyst to obtain a living polymer having an alkali-metal end and step 2 in which the living polymer is reacted with a compound represented by a specific formula to obtain the modified polymer rubber (patent document 2) is proposed.

Furthermore, a method in which a primary modification reaction for reacting a hydrocarbyloxysilane compound with the active site of a polymer having an organometal active site in the molecule is conducted and a secondary modification reaction for thereafter further reacting with the hydrocarbyloxysilane compound via a condensation reaction between hydrocarbyloxysilyl groups is conducted has been proposed as a method for producing a modified polymer which can be made to have an enhanced interaction with silica and carbon black to improve fracture characteristics, wear resistance, and low-heat-buildup characteristics (patent document 3).

PRIOR-ART DOCUMENTS

Patent Documents

Patent Document 1: JP-A-2004-18795
Patent Document 2: JP-A-2005-290355
Patent Document 3: WO 03/048216 A1

SUMMARY OF THE INVENTION

Problem to be Solved by the Invention

As described above, various conjugated diene rubbers capable of imparting excellent fuel-saving performance to motor vehicles have been proposed. However, further improvements in the fuel efficiency of motor vehicles are expected under the economic circumstances including a steep rise in gasoline price and the environmental circumstances including carbon dioxide emission. Accordingly, an object of the present invention is to provide a method for producing a modified conjugated diene rubber usable as a raw material for a crosslinked rubber which can be used in applications such as automotive tires and is capable of enhancing the fuel-saving performance of motor vehicles, etc.

Means for Solving the Problem

The inventors of the present invention diligently made investigations in order to overcome the problem. As a result, the inventors have found that a modified conjugated diene rubber which comes to have properties including excellent low-hysteresis-loss characteristics and which consequently is capable of imparting excellent fuel-saving performance when used in automotive tires or the like can be produced by using two specific alkoxysilane compounds in addition to a conjugated diene polymer having an alkali-metal or alkaline-earth-metal active end. The present invention has been thus completed.

The present invention provides the following [1] to [10].

[1] A method for producing a modified conjugated diene rubber which comprises
 (a) a step in which a conjugated diene polymer having an alkali metal or alkaline earth metal active end and obtained by polymerizing a conjugated diene compound or by polymerizing a conjugated diene compound with an aromatic vinyl compound is reacted with a first alkoxysilane compound which has an alkoxysilyl group having two or more alkoxy groups and has a group protected by a protecting group wherein deprotection is possible to obtain a modified conjugated diene polymer having an alkoxysilyl group and
 (b) a step in which the modified conjugated diene polymer having an alkoxysilyl group is reacted with a second alkoxysilane compound which has an alkoxysilyl group.

[2] The method for producing a modified conjugated diene rubber according to the above [1], wherein the group protected by a protecting group wherein deprotection is possible in the first alkoxysilane compound is one or more members selected from the group consisting of a nitrogen-containing group in which two hydrogen atoms of a primary amine have been replaced by two protecting groups, a nitrogen-containing group in which one hydrogen atom of a secondary amine has been replaced by one protecting group, a sulfur-containing group in which one hydrogen atom of a thiol has been replaced by one protecting group, a phosphorus-containing group in which two hydrogen atoms of a primary phosphine have been replaced by two protecting groups, and a phosphorus-containing group in which one hydrogen atom of a secondary phosphine has been replaced by one protecting group.

[3] The method for producing a modified conjugated diene rubber according to the above [1] or [2], wherein step (b) is conducted in the presence of a condensation catalyst for alkoxysilane compounds which contains a metallic element.

[4] The method for producing a modified conjugated diene rubber according to the above [3], wherein the condensation catalyst is a metal compound which contains at least one of the metallic elements that belong to Group 4, Group 12, Group 13, Group 14, and Group 15 of the periodic table.

[5] The method for producing a modified conjugated diene rubber according to the above [4] wherein an alkoxide, carboxylic acid salt, or acetylacetonato complex salt of the metallic element is used as the condensation catalyst.

[6] The method for producing a modified conjugated diene rubber according to any one of the above [1] to [5], comprising (c) a step in which a mixture obtained in step (b) is allowed to contact with water.

[7] A modified conjugated diene rubber obtained by the method for producing a modified conjugated diene rubber according to any one of the above [1] to [6].

[8] A rubber composition which comprises the modified conjugated diene rubber according to the above [7], silica and/or carbon black, and a crosslinking agent.

[9] A crosslinked rubber composition obtained by crosslinking the rubber composition according to the above [8].

[10] A tire which comprises the crosslinked rubber composition according to the above [9].

Effects of the Invention

According to the production method of the present invention, it is possible to obtain a modified conjugated diene rubber which achieves excellent shape retentivity and from which a crosslinked rubber composition excellent in terms of tensile strength, wear resistance, and wet skid resistance can be produced.

The crosslinked rubber composition produced from the modified conjugated diene rubber can be used in applications such as automotive tires and can enhance the fuel-saving performance of motor vehicles, etc.

MODES FOR CARRYING OUT THE INVENTION

The method of the present invention for producing a modified conjugated diene rubber includes: (a) a step in which a conjugated diene polymer having an alkali metal or alkaline earth metal active end and obtained by polymerizing a conjugated diene compound or by polymerizing a conjugated diene compound with an aromatic vinyl compound is reacted with a first alkoxysilane compound which has an alkoxysilyl group having two or more alkoxy groups and has a group protected by a protecting group wherein deprotection is possible to obtain a modified conjugated diene polymer having an alkoxysilyl group and (b) a step in which the modified conjugated diene polymer having an alkoxysilyl group is reacted with a second alkoxysilane compound which has an alkoxysilyl group.

[1] Method for Producing Modified Conjugated Diene Rubber:

[Step (a)]

Step (a) is a step in which a conjugated diene polymer having an alkali metal or alkaline earth metal active end and obtained by polymerizing a conjugated diene compound or by polymerizing a conjugated diene compound with an aromatic vinyl compound is reacted with a first alkoxysilane compound which has an alkoxysilyl group having two or more alkoxy groups and has a group protected by a protecting group wherein deprotection is possible to obtain a modified conjugated diene polymer having the alkoxysilyl group.

Examples of the conjugated diene polymer having an alkali-metal or alkaline-earth-metal active end include anionic polymers obtained by polymerizing a conjugated diene compound alone or copolymerizing a conjugated diene compound and an aromatic vinyl compound.

Methods for producing the conjugated diene polymer are not particularly limited so long as anionic polymerization is carried out with an alkali metal or alkaline earth metal (hereinafter sometimes referred to as "initiator" or "polymerization initiator") as stated above. With respect to polymerization methods, for example, any of a solution polymerization method, gas-phase polymerization method, and bulk polymerization method can be used. However, it is especially preferred to use a solution polymerization method. The mode of polymerization operation may be either batchwise or continuous. The metal constituting the active site present in the molecule of the conjugated diene polymer is an alkali metal or an alkaline earth metal, and it is preferred that the metal should be lithium, sodium, potassium, magnesium, or barium, in particular, lithium metal. These alkali metals or alkaline earth metals have the same function from the standpoint that the metals can give a conjugated diene polymer having a metallic active end capable of reacting with the first alkoxysilane compound, and alkali or alkaline earth metals which are not described in the Examples that will be described later can be used in the present invention.

Also it is effective to allow a monomer containing a functional group to coexist and to activate the functional groups in the polymer with an alkali metal or alkaline earth metal initiator. For example, to modify a copolymer containing an isobutylene unit, a p-methylstyrene unit, and a p-halogenomethylstyrene unit by introducing lithium into a functional-group part thereof and thereby converting the part into an active site is also effective.

As the conjugated diene monomers, for example, 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene, 1,3-hexadiene, 2-chloro-1,3-butadiene, and the like are specifically suitably used. These monomers may be used alone or in combination of two or more thereof. Especially suitable among these compounds are 1,3-butadiene, isoprene, 2,3-dimethyl-1,3-butadiene, and the like. These conjugated diene monomers have the same function from the standpoint that these monomers can give a conjugated diene polymer having a metallic active end capable of reacting with the first alkoxysilane compound, and conjugated diene monomers which are not described in the Examples that will be described later can be used in the present invention.

As the aromatic vinyl compounds, for example, styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, 4-vinylbenzyl dimethylaminoethyl ether, dimethylaminomethylstyrene, N,N-dimethylaminoethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, diphenylethylenes containing a tertiary amino group, and the like are suitably used. These compounds may be used alone or in combination of two or more thereof. Among these compounds, styrene is specifically preferable. These aromatic vinyl compounds have the same function from the standpoint that these compounds can give a conjugated diene polymer having a metallic active end capable of reacting with the first alkoxysilane compound, and aromatic vinyl compounds which are not described in the Examples that will be given later can be used in the present invention.

In the case where a conjugated diene monomer and an aromatic vinyl compound are used and copolymerized, it is preferable to use 1,3-butadiene and styrene respectively as the two monomers. The monomers are superior in that the monomers are easily available and bring about high living characteristics in anionic polymerization. When a solution polymerization method is used, the concentration of the monomers in the solvent is preferably 5-50% by mass, more preferably 10-30% by mass, from the standpoint of maintaining a balance between productivity and ease of polymerization control. In the case where a conjugated diene monomer and an aromatic vinyl compound are used and copolymerized, the content of the aromatic vinyl compound in the monomer mixture to be used is preferably 3-55% by mass, more preferably 5-50% by mass, from the standpoint of maintaining a balance between the low-hysteresis-loss characteristics and wet skid resistance of the crosslinked rubber composition to be obtained.

Examples of compounds usable as the alkali metal or alkaline earth metal initiator include alkyllithiums, alkylenedilithiums, lithium alkyleneimides, lithium dialkylamides, phenyllithium, stilbene lithium, lithium naphthalene, sodium naphthalene, potassium naphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, barium stearate, kethylbarium, sodium biphenyl, a potassium-tetrahydrofuran complex, a potassium-diethoxyethane complex, and the sodium salt of α-methylstyrene tetramer. Suitable examples thereof include organolithium compounds such as alkyllithiums and lithium amide compounds such as lithium alkyleneimides. In the case where any of the former organolithium compounds is used, a conjugated diene polymer is obtained in which the polymerization initiation end is a hydrocarbon group and the other end is a polymerization-active site. In the case where any of the latter lithium amide compounds is used, a conjugated diene polymer is obtained in which the polymerization initiation end is a nitrogen-containing group and the other end is a polymerization-active site. Those alkali metal or alkaline earth metal initiators have the same function from the standpoint that these initiators can give a conjugated diene polymer having a metallic active end capable of reacting with the first alkoxysilane compound, and such initiators which are not described in the Examples that will be described later can be used in the present invention.

As the organolithium compounds, organolithium compounds which have a hydrocarbon group having 1-20 carbon atoms are preferable. Examples thereof include methyllithium, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, a product of reaction between diisopropenylbenzene and butyllithium, t-butyllithium, n-hexyllithium, benzyllithium, phenyllithium, stilbene lithium, 1,4-dilithiobutane, 1,3,5-trilithiobenzene, a product of reaction of n-butyllithium with 1,3-butadiene and divinylbenzene, a product of reaction between n-butyllithium and a polyacetylene compound, 4-cyclopentyllithium, 1,2-dilithiomethane, 1,4-dilithiobutane, 1,4-dilithio-2-ethylcyclohexane, 1,3,5-trilithiobenzene etc. Among these, n-butyllithium and sec-butyllithium are preferable.

On the other hand, examples of the lithium amide compounds include lithium hexamethyleneimide, lithium pyrrolidide, lithium piperidide, lithium heptamethyleneimide, lithium dodecamethyleneimide, lithium morpholide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, 3-[N,N-bis(trimethylsilyl)]-1-propyllithium, 3-[N,N-bis(trimethylsilyl)]-2-methyl-1-propyllithium, 3-[N,N-bis(trimethylsilyl)]-2,2-dimethyl-1-propyllithium, 4-[N,N-bis(trimethylsilyl)]-1-butyllithium, 5-[N,N-bis(trimethylsilyl)]-1-pentyllithium, 8-[N,N-bis(trimethylsilyl)]-1-octyllithium, 3-(2,2,5,5-tetramethyl-2,5-disila-1-azacyclopentane)-1-propyllitium, 2-methyl-3-(2,2,5,5-tetramethyl-2,5-disila-1-azacyclopentane)-1-propyllithium, 2,2-dimethyl-3-(2,2,5,5-tetramethyl-2,5-disila-1-azacyclopentane)-1-propyllithium, 4-(2,2,5,5-tetramethyl-2,5-disila-1-azacyclopentane)-1-butyllithium, and 6-(2,2,5,5-tetramethyl-2,5-disila-1-azacyclopentane)-1-hexyllithium. Among these, from the standpoints of the effect of interacting with carbon black or silica and of the ability to initiate polymerization, cyclic lithium amides such as lithium hexamethyleneimide, lithium pyrrolidide, lithium piperidide, lithium heptamethyleneimide, and lithium dodecamethyleneimide are preferable. Especially, lithium hexamethyleneimide, lithium pyrrolidide, and lithium piperidide are preferable.

Although those lithium amide compounds which have been prepared beforehand from a secondary amine and a lithium compound are generally used in the polymerization in many cases, it is possible to prepare the lithium amide compounds in the polymerization system (in-situ). The amount of the polymerization initiator to be used is selected preferably from the range of 0.2-20 mmol per 100 g of the monomers.

Specific examples of methods for producing the conjugated diene polymer by anionic polymerization using any of the lithium compounds as a polymerization initiator include a method in which either a diene monomer or a diene monomer and an aromatic vinyl compound are subjected to anionic polymerization in an organic solvent which is inert to the reaction, e.g., a hydrocarbon solvent such as an aliphatic, alicyclic, or aromatic hydrocarbon compound, with using any of the lithium compounds as a polymerization initiator in the presence of a randomizer, which is used if desired. By such a method, the desired conjugated diene polymer can be obtained.

It is preferred that the hydrocarbon solvent should be a hydrocarbon solvent having 3-8 carbon atoms. Examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene etc. These compounds may be used alone or as a mixture of two or more thereof.

The randomizer, which is used if desired, is a compound having the function of, for example, controlling the microstructure of the conjugated diene polymer, e.g., increasing the content of vinyl bonds (1,2-bonds) in the butadiene moieties in a butadiene/styrene copolymer or of vinyl bonds (1,2-bonds and 3,4-bonds) in an isoprene polymer, or controlling the compositional distribution of monomer units in the conjugated diene polymer, e.g., randomizing the butadiene units and the styrene units in a butadiene/styrene copolymer. This randomizer is not particularly limited, and any desired compound suitably selected from known compounds which have conventionally been in general use as randomizers can be used. Specific examples thereof include ethers, tertiary amines, and the like such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinuclidine, potassium t-amylate, potassium t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline, and quinoline. These randomizers may be used alone, or two or more thereof may be used in combination.

In the case where it is desired to improve the reactivity of the polymerization initiator or where it is desired to introduce the aromatic vinyl compound into the polymer so that the compound is randomly arranged therein or to impart single chains or long chains of the aromatic vinyl compound, a potassium compound may be added together with the polymerization initiator. As the potassium compound to be added together with the polymerization initiator, for example, a potassium alkoxide or potassium phenoxide represented by potassium isopropoxide, potassium t-butoxide, potassium t-amyloxide, potassium n-heptoxide, potassium benzyl oxide, or potassium phenoxide; the potassium salt of isovaleric acid, caprylic acid, lauric acid, palmitic acid, stearic acid, oleic acid, linoleic acid, benzoic acid, phthalic acid, 2-ethylhexanoic acid, or the like; the potassium salt of an organic sulfonic acid such as dodecylbenzenesulfonic acid, tetradecylbenzenesulfonic acid, hexadecylbenzenesulfonic acid, or octadecylbenzenesulfonic acid; the potassium salt of an organic partial ester of phosphorous acid, such as diethyl phosphite, diisopropyl phosphite, diphenyl phosphite, dibutyl phosphite, or dilauryl phosphite; or the like can be used.

It is preferred that these potassium compounds should be added in an amount of 0.005-0.5 mol per gram atom equivalent of the alkali metal or alkaline earth metal of the polymerization initiator. When the amount thereof is below 0.005 mol, there are cases where the effect of the addition of the potassium compounds (improvement of the reactivity of the polymerization initiator, randomization of the aromatic vinyl compound, or impartation of single or long chains) is not appeared. On the other hand, when the amount thereof exceeds 0.5 mol, not only the polymerization activity decreases, resulting in a considerable decrease in productivity, but also there are cases where the efficiency of modification in the modification reaction with the first alkoxysilane compound decreases.

The temperature in the polymerization reaction is preferably from −20 to 150° C., more preferably from 0-120° C. Although the polymerization reaction can be conducted under the pressure which generates, it is usually preferable to operate the system at a pressure sufficient to keep the monomers substantially in a liquid-phase state. Namely, a pressure higher than the pressure which generates can be used if desired, although the pressure depends on the individual substances to be polymerized and on the polymerization medium and polymerization temperature used. Such a pressure is obtained by an appropriate method, for example, by pressurizing the reactor with a gas which is inert to the polymerization reaction.

It is desirable in this polymerization that all of the raw materials which participate in the polymerization, including the polymerization initiator, solvent, and monomers, should be used after removal of reaction-inhibitive substances such as, for example, water, oxygen, carbon dioxide, and protonic compounds. In this connection, in the case where a polymer is obtained as an elastomer, it is preferable that the polymer or copolymer to be obtained should have a glass transition temperature (Tg), as determined by differential thermal analysis, of −90° C. to 0° C. It is difficult to obtain a polymer having a glass transition temperature lower than −90° C. When the glass transition temperature of the polymer exceeds 0° C., there are cases where this polymer has too high a viscosity in a room temperature range and is difficult to handle.

As the alkoxysilyl group in the first alkoxysilane compound, an alkoxysilyl group having two or more alkoxy groups is used from the standpoint of reactivity with the conjugated diene polymer having an alkali-metal or alkaline-earth-metal active end and from the standpoint of reactivity with the second alkoxysilane compound, which will be described later. Suitable examples of the alkoxy groups include alkoxy groups which have an alkyl group having 1-20 carbon atoms or have an aryl group. In the case where there are two or more alkoxy groups, these alkoxy groups may be the same or different.

The group in the first alkoxysilane compound which has been protected by an eliminable protecting group is a group which is protected against the alkali metal or alkaline earth metal active end of the conjugated diene polymer. Examples thereof include a nitrogen-containing group in which two hydrogen atoms of a primary amine have been replaced by two protecting groups, a nitrogen-containing group in which one hydrogen atom of a secondary amine has been replaced by one protecting group, a group containing sulfur in which one hydrogen atom of a thiol has been replaced by one protecting group, a group containing phosphorus in which two hydrogen atoms of a primary phosphine have been replaced by two protecting groups, and a group containing phosphorus in which one hydrogen atom of a secondary phosphine has been replaced by one protecting group. One of such first alkoxysilane compounds may be used alone, or two or more thereof may be used in combination.

Examples of the compound that has a group containing nitrogen in which two hydrogen atoms of a primary amine have been replaced by two protecting groups or a group containing nitrogen in which one hydrogen atom of a secondary amine has been replaced by one protecting group and that further has an alkoxysilyl group include N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, N,N-bis(triethylsilyl)aminopropylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropylmethyldiethoxysilane, N,N-bis(triethylsilyl)aminoethyltrimethoxysilane, N,N-bis(triethylsilyl)aminoethyltriethoxysilane, N,N-bis(triethylsilyl)aminoethylmethyldimethoxysilane, N,N-bis(triethylsilyl)aminoethylmethyldiethoxysilane, N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilane, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-methyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, N-[3-(trimethoxysilyl)propyl]-N,N'-diethyl-N'-trimethylsilyl-ethane-1,2-diamine, N-[3-(triethoxysilyl)propyl]-N,N'- diethyl-N'-trimethylsilyl-ethane-1,2-diamine, N-[3-(methyldimethoxysilyl)propyl]-N,N'-diethyl-N'-trimethylsilyl-ethane-1,2-diamine, N-[3-(methyldimethoxysilyl)propyl]-N,N'-diethyl-N'-trimethylsilyl-p-phenylenediamine, N-[3-(triethoxysilyl)propyl]-N,N'-diethyl-N'-trimethylsilyl-p-phenylenediamine, 3-[3-(trimethylsilylethylamino)-1-pyrrolidinyl]propylmethyldiethoxysilane, 3-[3-(trimethylsilylpropylamino)-1-pyrrolidinyl]propyltriethoxysilane, N-(3-(diethoxymethylsilyepropyl)-N-ethyl-N'-(2-ethoxyethyl)-N'-trimethylsilyl-ethane-1,2-diamine, N-[3-(tripropoxysilyl)propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylaminoethyl)-N'-triethylsilyl-ethane-1,2-diamine, N-[3-(triethoxysilyl)propyl]-N-ethyl-N'-(2-diethylaminoethyl)-N'-triethylsilyl-ethane-1,2-diamine, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 3-(3-trimethylsilyl-1-imidazolidinyl)propylethyldiethoxysilane, 3-(3-trimethylsilyl-1-imidazolidinyl)propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane, 4-(4-trimethylsilyl-1-piperazinyl)butyltriethoxysilane, 3-di(t-butyldimethylsilyl)aminopropyltrimethoxysilane, 3-di(t-butyldimethylsilyl)aminopropyltriethoxysilane, 3-di(t-butyldimethylsilyl)aminopropylmethyldimethoxysilane, 3-di(t-butyldimethylsilyl)aminopropylmethyldiethoxysilane, bis[3-(triethoxysilyl)propyl]trimethylsilylamine, and bis[3-(trimethoxysilyl)propyl]trimethylsilylamine.

In this connection, N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)propyl]-N,N'-diethyl-N'-trimethylsilyl-ethane-1,2-diamine, N-[3-(triethoxysilyl)propyl]-N,N'-diethyl-N'-trimethylsilyl-ethane-1,2-diamine, 3-(4-trimethylsilyl-1-peperazino)propyltriethoxysilane, bis[3-(triethoxysilyl)propyl]trimethylsilylamine, and bis[3-(trimethoxysilyl)propyl]trimethylsilylamine are preferable.

Examples of the compound that has a group containing sulfur in which one hydrogen atom of a thiol has been replaced by one protecting group and that further has an alkoxysilyl group include S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, and S-trimethylsilylmercaptoethylmethyldiethoxysilane. In this connection, S-trimethylsilylmercaptopropyltrimethoxysilane and S-trimethylsilylmercaptopropyltriethoxysilane are preferable.

Examples of the compound that has a group containing phosphorus in which two hydrogen atoms of a primary phosphine have been replaced by two protecting groups or a group containing phosphorus in which one hydrogen atom of a secondary phosphine has been replaced by one protecting group and that further has an alkoxysilyl group include P,P-bis(trimethylsilyl)phosphinopropylmethyldimethoxysilane, P,P-bis(trimethylsilyl)phosphinopropyltrimethoxysilane, P,P-bis(trimethylsilyl)phosphinopropyltriethoxysilane, P,P-bis(trimethylsilyl)phosphinopropylmethyldiethoxysilane, P,P-bis(trimethylsilyl)phosphinoethyltrimethoxysilane, P,P-bis(trimethylsilyl)phosphinoethyltriethoxysilane, P,P-bis(trimethylsilyl)phosphinoethylmethyldimethoxysilane, and P,P-bis(trimethylsilyl)phosphinoethylmethyldiethoxysilane. In this connection, P,P-bis(trimethylsilyl)phosphinopropyltrimethoxysilane and P,P-bis(trimethylsilyl)phosphinopropyltriethoxysilane are preferable.

By reacting the conjugated diene polymer having an alkali metal or alkaline earth metal active end with the first alkoxysilane compound, the alkali metal or alkaline earth metal active end site combines with one of the two or more alkoxy groups present in the polymer. As a result, a modified conjugated diene polymer which has the remaining alkoxysilyl group can be obtained. The first alkoxysilane compound is reactive not only with the conjugated diene polymer having the metallic active end constituted of an alkali metal or alkaline earth metal, but also, when a rubber composition is produced, reacts or interacts with the carbon black and/or silica each serving as a reinforcement, thereby imparting excellent low-hysteresis-loss characteristics to the crosslinked rubber composition to be produced. From this standpoint, the first alkoxysilane compounds described above can be used in the present invention even when the compounds are not described in the Examples which will be described later.

A modification reaction for introducing the first alkoxysilane compound into the alkali metal or alkaline earth metal active end of the conjugated diene polymer can be conducted, for example, as a solution reaction (the solution to be used here may be a solution which contains unreacted monomers remaining after the polymerization). There are no particular limitations on the mode of modification reaction, and the reaction may be conducted using a batch reactor or may be continuously conducted using an apparatus such as a multistage continuous reactor or an in-line mixer. It is preferable that after completion of the polymerization reaction, the modification reaction should be conducted prior to a solvent removal treatment, water treatment, heat treatment, any of various operations necessary for polymer isolation, etc.

It is preferable that the amount of the first alkoxysilane compound to be used in this modification reaction is 0.1 mol equivalent or more and it is more preferable that the amount is 0.3 mol equivalents or more, to the active sites of the conjugated diene polymer obtained by anionic polymerization. In case where the amount thereof is less than 0.1 mol equivalent, there are cases where the modification reaction does not proceed sufficiently and the property of dispersing reinforcements is not sufficiently improved, which results in a crosslinked rubber composition which is poor in tensile strength, wear resistance, wet skid resistance, and low-hysteresis-loss characteristics.

Methods for adding the first alkoxysilane compound, which is a modifier, are not particularly limited, and examples thereof include a method in which the compound is added at a time, a method in which the compound is added dividedly, and a method in which the compound is continuously added. However, the method in which the compound is added at a time is preferred. The first alkoxysilane compound may be added in the form of a solution in which the solvent is any of the conjugated diene monomers, aromatic vinyl compounds, hydrocarbon solvents, and randomizers which were described above or another substance.

With respect to temperature for the modification reaction, the polymerization temperature used for producing the conjugated diene polymer can be directly used. Specifically, examples of preferable ranges include 0-120° C. A more preferable range is 20-100° C. Lower temperatures tend to result in an increase in the viscosity of the polymer, and higher temperatures are apt to result in deactivation of the polymerization-active ends. Consequently, a temperature within that numerical range is preferable. The reaction time in the primary modification reaction is preferably from 1 minute to 5 hours, more preferably from 2 minutes to 1 hour.

When the conjugated diene polymer is produced, it is possible to add a coupling agent in combination with the first alkoxysilane compound. Examples of the coupling agent are as follows. This coupling agent is added in the stage when the conjugated diene polymer is modified with the first alkoxysilane compound.

Specifically, examples of the coupling agent which is used in combination with the first alkoxysilane compound and reacted with polymerization-active ends include at least one compound selected from the group consisting of (a) isocyanate compounds and/or isothiocyanate compounds, (b) amide compounds and/or imide compounds, (c) pyridyl-substituted ketone compounds and/or pyridyl-substituted vinyl compounds, (d) silicon compounds, (e) ester compounds, (f) ketone compounds, (g) tin compounds, (h) epoxy compounds, (i) phosphoric acid ester compounds, (j) compounds containing an acid anhydride group, (k) compounds containing an arylvinyl group, and (l) compounds containing a halogenated carbon group.

Suitable examples of the isocyanate compounds or thioisocyanate compounds as ingredient (a), among those compounds, include 2,4-tolylene diisocyanate, 2,6-tolylene diisocyanate, diphenylmethane diisocyanate, diphenylethane diisocyanate, polymeric type diphenylmethane diisocyanate (C-MDI), isophorone diisocyanate, hexamethylene diisocyanate, 1,3,5-benzene triisocyanate, and phenyl 1,4-diisothiocyanate.

With respect to the amide compounds or imide compounds as ingredient (b), suitable examples thereof include amide compounds such as succinamide, phthalamide, N,N,N',N'-tetramethylphthalamide, oxamide, N,N,N',N'-tetramethyloxamide, adipic acid bisdimethylamide, and poly(methacrylic acid) dimethylamide and imide compounds such as succinimide, N-methylsuccinimide, maleimide, N-methylmaleimide, phthalimide, and N-methylphthalimide.

With respect to the pyridyl-substituted ketone compounds or pyridyl-substituted vinyl compounds as ingredient (c), suitable examples thereof include dibenzoylpyridine, diacetylpyridine, divinylpyridine etc.

With respect to the silicon compounds as ingredient (d), suitable examples thereof include dibutyldichlorosilicon, methyltrichlorosilicon, methyldichlorosilicon, tetrachlorosilicon, silicon tetrabromide, silicon tetraiodide, monochlorotrimethoxysilane, monobromotrimethoxysilane, dichlorodimethoxysilane, dibromodimethoxysilane, trichloromethoxysilane, tribromomethoxysilane, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, triethoxymethylsilane, triphenoxymethylsilane, trimethoxysilane, methyltriethoxysilane, tetramethoxysilane, tetraethoxysilane, tetrabutoxysilane, 3-acetylpropoxytrimethoxysilane, N-(1,3-dimethylbutylidene)-3-(triethoxysilyl)-1-propanamine, N-(1,3-dimethylbutylidene)-3-(tributoxysilyl)-1-propanamine, N-(1-methylpropylidene)-3-(triethoxysilyl)-1-propanamine, N-ethylidene-3-(triethoxysilyl)-1-propanamine, N-(3-triethoxysilylpropyl)-4,5-dihydroimidazole, 3-chloropropoxytrimethoxysilane, 4,5-epoxyheptylmethyldimethoxysilane, and bis(triethoxysilylpropyl)tetrasulfide.

With respect to the ester compounds as ingredient (e), suitable examples thereof include dimethyl adipate, diethyl adipate, dimethyl terephthalate, diethyl tetraphthalate, dimethyl phthalate, dimethyl isophthalate, diethyl malonate, diethyl phthalate, diethyl glutarate, and diethyl maleate.

Suitable examples of the ketone compounds as ingredient (f) include N,N,N',N'-tetramethyl-4,4'-diaminobenzophenone, N,N,N',N'-tetraethyl-(4,4'-diamino)benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone, and 4,4'-diacetylbenzophenone.

With respect to the tin compounds as ingredient (g), suitable examples thereof include tetrachlorotin, tetrabromotin, trichlorobutyltin, trichloromethyltin, trichloroethyltin, trichlorophenyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate etc.

With respect to the epoxy compounds as ingredient (h), suitable examples thereof include polyglycidyl ethers of polyhydric alcohols, such as ethylene glycol diglycidyl ether and glycerol triglycidyl ether, polyglycidyl ethers of aromatic compounds having two or more phenyl groups, such as the diglycidyl ether of bisphenol A, 1,4-diglycidylbenzene, 1,3,5-triglycidylbenzene, and polyepoxy compounds such as polyepoxidized liquid polybutadiene, epoxy-containing tertiary amines such as 4,4'-diglycidyldiphenylmethylamine and 4,4'-diglycidyldibenzylmethylamine, glycidylamino compounds such as diglycidylaniline, diglycidyl-o-toluidine, tetraglycidyl-m-xylenediamine, tetraglycidylaminodiphenylmethane, tetraglycidyl-p-phenylenediamine, diglycidylaminomethylcyclohexane, and tetraglycidyl-1,3-bisaminomethylcyclohexane, and compounds having an epoxy group and another functional group, such as 3-glycidoxypropyltrimethoxysilane, 3-glycidoxypropyltriethoxysilane, 3-glycidoxypropyltributoxysilane, epoxy-modified silicones, epoxidized soybean oil, and epoxidized linseed oil.

With respect to the phosphoric acid ester compounds as ingredient (i), suitable examples thereof include polyhalogenated phosphorus compounds such as trichlorophosphine and tribromophosphine, phosphorous acid ester compounds such as trisnonylphenyl phosphite, trimethyl phosphite, and triethyl phosphite, and trimethyl phosphate, triethyl phosphate, etc.

With respect to the compounds containing an acid anhydride group as ingredient (j), suitable examples thereof include pyromellitic anhydride and styrene/maleic anhydride copolymers.

With respect to the compounds containing an arylvinyl group as ingredient (k), suitable examples thereof include divinylbenzene, diisopropenylbenzene, and divinylbenzene oligomers.

With respect to the compounds containing a halogenated carbon group as ingredient (l), suitable examples thereof include trichloropropane, tribromopropane, and tetrachlorobutane.

One of these compounds, which are used in combination with the first alkoxysilane compound and reacted with polymerization-active ends, can be used alone, or two or more thereof can be used in combination.

The amount of the coupling agent to be used may be 1 mol or less, preferably from 0.1-0.5 mol, in terms of the amount of the substituents in the coupling agent which are capable of coupling, per gram-atom equivalent of the alkali metal or alkaline earth metal of the polymerization initiator. When the amount thereof exceeds 1 mol, there are cases where the conversion of the first alkoxysilane compound decreases and the resultant polymer does not give a crosslinked rubber composition having excellent low-hysteresis-loss characteristics, etc.

[Step (b)]

Step (b) is a step in which the modified conjugated diene polymer having an alkoxysilyl group is reacted with a second alkoxysilane compound which has an alkoxysilyl group.

Examples of the second alkoxysilane compound include compounds which have both a primary amino group, secondary amino group, tertiary amino group, imino group, pyridyl group, primary phosphino group, secondary phosphino group, tertiary phosphino group, epoxy group, isocyanate group, thioepoxy group, hydroxyl group, carboxyl group, oxetane group, thiol group, or the like and an alkoxysilyl group and compounds which have both an ethanolamine, benzimidazole, melamine, or amidine structure or the like and an alkoxysilyl group.

The number of alkoxysilyl groups in the second alkoxysilane compound is 1 or larger, and is preferably 2 or 3, more preferably 3, from the standpoint of the efficiency of the reaction.

One of such second alkoxysilane compounds may be used alone, or two or more thereof may be used in combination.

Examples of the compounds which have both a primary amino group, secondary amino group, tertiary amino group, imino group, pyridyl group, primary phosphino group, secondary phosphino group, tertiary phosphino group, epoxy group, isocyanate group, thioepoxy group, hydroxyl group, carboxyl group, oxetane group, or thiol group and an alkoxysilyl group include the first alkoxysilane compounds described above as examples with regard to step (a), and further include 3-aminopropyltrimethoxysilane, 3-aminopropyltriethoxysilane, 3-mercaptomethyltrimethoxysilane, 3-mercaptomethyltriethoxysilane, 3-mercaptopropyltrimethoxysilane, 3-mercaptopropyltriethoxysilane, aminophenyltrimethoxysilane, aminophenyltriethoxysilane, 3-(N-methylamino)propyltrimethoxysilane, 3-(N-methylamino)propyltriethoxysilane, N-(2-aminoethyl)-3-aminopropyltrimethoxysilane, 2-(6-aminohexyl)aminopropyltrimethoxysilane, N-[2-(trimethoxysilyl)ethyl]-N,N',N'-trimethylethane-1,2-diamine, N-[2-(dimethoxymethylsilyl)ethyl]-N-ethyl-N',N'-dimethylethane-1,2-diamine, N-[3-(trimethoxysilyl)propyl]-N,N',N'-trimethylpropane-1,3-diamine, N-[3-(dimethoxymethylsilyl)propyl]-N-ethyl-N',N'-dimethylpropane-1,3-diamine, N-[3-(triethoxysilyl)propyl]-N,N',N'-triethyl-2-methylpropane-1,3-diamine, N-[3-(dimethoxymethylsilyl)propyl]-2,N,N',N'-tetramethylpropane-1,3-diamine, N-(2-dimethylaminoethyl)-N'-[2-(trimethoxysilyl)ethyl]-N,N'-dimethylethane-1,2-diamine, N-[2-(diethoxypropylsilyl)ethyl]-N'-(3-ethoxypropyl)-N,N'-dimethylethane-1,2-diamine, N-[2-(trimethoxysilyl)ethyl]-N'-methoxymethyl-N,N'-dimethylethane-1,2-diamine, N-[2-(trimethoxysilyl)ethyl]-N,N'-dimethyl-N'-(2-trimethylsilylethyl)ethane-1,2-diamine, N-[2-(triethoxysilyl)ethyl]-N,N'-diethyl-N'-(2-dibutylmethoxysilylethyl)ethane-1,2-diamine, 1-[3-(triethoxysilyl)propyl]-4-methylpiperazine, 1-[3-(diethoxyethylsilyl)propyl]-4-methylpiperazine, 1-[3-(trimethoxysilyl)propyl]-3-methylimidazolidine, 1-[3-(diethoxyethylsilyl)propyl-3-ethylimidazolidine, 1-[3-(triethoxysilyl)propyl]-3-methylhexahydropyrimidine, 1-[3-(dimethoxymethylsilyl)propyl]-3-methylhexahydropyrimidine, 3-[3-(tributoxysilyl)propyl]-1-methyl-1,2,3,4-tetrahydropyrimidine, 3-[3-(dimethoxymethylsilyl)propyl]-1-ethyl-1,2,3,4-tetrahydropyrimidine, 1-(2-ethoxyethyl)-3-[3-(trimethoxysilyl)propyl]imidazolidine, 2-(trimethoxysilyl)-1,3-dimethylimidazolidine, 2-(diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, 2-[3-(2-dimethylaminoethyl)-2-(ethyldimethoxysilyl)imidazolidin-1-yl]ethyldimethylamine, 5-(trimethoxysilyl)-1,3-bis(2-methoxyethyl)hexahydropyrimidine, 5-(ethyldimethoxysilanyl)-1,3-bistrimethylsilanylhexahydropyrimidine, 2-(3-diethoxyethylsilylpropyl)-1,3-diethylimidazolidine, 2-(3-triethoxysilylpropyl)-1,4-diethylpiperazine, 2-(3-dimethoxymethylsilylpropyl)-1,4-dimethylpiperazine, 5-(3-triethoxysilylpropyl)-1,3-dipropylhexahydropyrimidine, 5-(3-diethoxyethylsilylpropyl)-1,3-diethylhexahydropyrimidine, 2-[3-(2-dimethylaminoethyl)-2-(3-ethyldimethoxysilylpropyl)imidazolidin-1-yl]ethyldimethylamine, 5-(3-trimethoxysilylpropyl)-1,3-bis(2-methoxyethyl)hexahydropyrimidine, 5-(3-ethyldimethoxysilylpropyl)-1,3-bis(2-trimethylsilylethyl)hexahydropyrimidine, 3-dimethylaminopropyltrimethoxysilane, 3-diethylaminopropyltrimethoxysilane, 3-dimethylaminopropyltriethoxysilane, 3-diethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-diethylaminopropylethyldimethoxysilane, 3-ethylmethylaminopropylmethyldimethoxysilane, 3-ethylmethylaminopropylethyldimethoxysilane, 3-dimethylaminopropylmethyldiethoxysilane, 3-diethylaminopropylmethyldiethoxysilane, 3-dimethylaminopropylethyldiethoxysilane, 3-diethylaminopropylethyldiethoxysilane, 3-ethylmethylaminopropylmethyldiethoxysilane, 3-ethylmethylaminopropylethyldiethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxymethyl)aminopropyltrimethoxysilane, 3-di(ethoxyethyl)aminopropyltrimethoxysilane, 3-di(ethoxymethyl)aminopropyltriethoxysilane, 3-di(ethoxyethyl)aminopropyltriethoxysilane, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperizinopropyltrimethoxysilane, 3-piperizinopropyltriethoxysilane, 3-piperizinopropylmethyldimethoxysilane, 3-piperizinopropylethyldimethoxysilane, 3-piperizinopropylmethyldiethoxysilane, 3-piperizinopropylethyldiethoxysilane, N-(1,3-dimethylbutylidene)-3-(triethoxysilyl)-1-propanamine, N-(1,3-methylethylidene)-3-(triethoxysilyl)-1-propanamine, N-ethylidene-3-(triethoxysilyl)-1-propanamine, N-(1-methylpropylidene)-

3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, the trimethoxysilyl compounds, methyldiethoxysilyl compounds, and ethyldimethoxysilyl compounds which correspond to those triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, 3-hexamethyleneiminopropylethyldiethoxysilane, the mercaptosilane compounds described as examples in JP-A-2006-249069, 3-glycidoxypropyltrimethoxysilane, 3-glycidoxypropyltriethoxysilane, 3-glycidoxypropyltributoxysilane, epoxy-modified silicones, 2-(3,4-epoxycyclohexyl)ethyltrimethoxysilane, 3-glycidoxypropylmethyldiethoxysilane, 3-isocyanatopropyltriethoxysilane, 3-isocyanatopropyltrimethoxysilane, and 3-isocyanatopropylmethyldiethoxysilane.

This second alkoxysilane compound to be mixed with the modified conjugated diene polymer having an alkoxysilyl group can be, for example, in a solution form. There are no particular limitations on the mode of mixing, and the mixing may be conducted using a batch mixer or may be continuously conducted using an apparatus such as a multistage continuous mixer or an in-line mixer. A step in which water is brought into contact may be additionally conducted after the mixing. It is preferable that after completion of the polymerization reaction, the reaction caused by this mixing should be conducted prior to a solvent removal treatment, water treatment, heat treatment, any of various operations necessary for polymer isolation, etc.

The amount of the second alkoxysilane compound to be used in this mixing is preferably 0.2 mole equivalents or more, more preferably 0.3 mole equivalents or more, to the active sites of the conjugated diene polymer obtained by anionic polymerization. When the amount thereof is less than 0.2 mole equivalents, there are cases where the second alkoxysilane compound is not sufficiently incorporated through onium formation and the property of dispersing reinforcements is not sufficiently improved, which results in a crosslinked rubber composition which is poor in tensile strength, wear resistance, wet skid resistance, and low-hysteresis-loss characteristics. It is possible to use the first alkoxysilane compound so that this compound serves also as the second alkoxysilane compound. In this case, the first alkoxysilane compound can be used in an amount of 1.2 mole equivalents or more to the active sites of the conjugated diene polymer obtained by anionic polymerization.

Methods for adding the second alkoxysilane compound, which is a modifier, are not particularly limited, and examples thereof include a method in which the compound is added at a time, a method in which the compound is added dividedly, and a method in which the compound is continuously added. However, the method in which the compound is added at a time is preferable. The second alkoxysilane compound may be added in the form of a solution in which the solvent may be any of the hydrocarbon solvents and randomizers which were described above. The second alkoxysilane compound may be added simultaneously with the first alkoxysilane compound, or may be added after the reaction of the first alkoxysilane compound.

With respect to the temperature at which the second alkoxysilane compound is reacted with the modified conjugated diene polymer having an alkoxysilyl group, the polymerization temperature used for producing the conjugated diene polymer can be used directly. Specifically, examples of preferable ranges include 0-120° C. A more preferable range is 20-100° C. Lower temperatures tend to result in an increase in the viscosity of the polymer, while higher temperatures are apt to result in alteration of the polymerization-active ends. Consequently, a temperature within that numerical range is preferable. The mixing time is preferably from 1 minute to 5 hours, more preferably from 2 minutes to 1 hour.

It is possible to conduct step (b) in the presence of a condensation catalyst for alkoxysilane compounds which contains a metallic element (hereinafter often referred to simply as "condensation catalyst").

As a method for mixing the second alkoxysilane compound having an alkoxysilyl group with a condensation catalyst, any of the following three embodiments can be used. Whichever embodiment is employed, a modified conjugated diene rubber can be obtained.

First Embodiment

An embodiment including (b-1) a step in which the modified conjugated diene polymer having an alkoxysilyl group is mixed with the second alkoxysilane compound having an alkoxysilyl group and (b-2) a step in which the mixture obtained in step (b-1) is mixed with a condensation catalyst.

Second Embodiment

An embodiment including (b-3) a step in which the modified conjugated diene polymer having an alkoxysilyl group is mixed with a condensation catalyst and (b-4) a step in which the mixture obtained in step (b-3) is mixed with the second alkoxysilane compound having an alkoxysilyl group.

Third Embodiment

An embodiment including (b-5) a step in which the modified conjugated diene polymer having an alkoxysilyl group, the second alkoxysilane compound having an alkoxysilyl group, and a condensation catalyst are mixed together simultaneously.

As the condensation catalyst for alkoxysilane compounds which contains a metallic element, it is preferable to use a metal compound which contains at least one of the metallic elements that belong to Group 4, Group 12, Group 13, Group 14, and Group 15 of the periodic table. Specific suitable examples of the metallic element include titanium, zirconium, aluminum, bismuth, and tin.

It is preferable that the condensation catalyst for alkoxysilane compounds which contains a metallic element should be an alkoxide, carboxylic acid salt, or acetylacetonato complex of any of the metallic elements described above.

In this case, not only the condensation catalyst accelerates the condensation of the modified conjugated diene polymer with the second alkoxysilane compound, but also the condensation catalyst itself reacts with the modified conjugated diene polymer and with the residual alkoxysilyl group of the second alkoxysilane compound and can thereby enhance reactivity with fillers.

Specifically, examples of the condensation catalyst include tetramethoxytitanium, tetraethoxytitanium, tetra-n-propoxytitanium, tetraisopropoxytitanium, tetra-n-butoxytitanium, tetra-n-butoxytitanium oligomers, tetra-sec-butoxytitanium, tetra-tert-butoxytitanium, tetra(2-ethylhexyloxy) titanium, bis(octanediolato)bis(2-ethylhexyloxy)titanium, tetra(octanediolato)titanium, titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonate bis(ethylacetoacetate), titanium tributoxyacetylacetonate, titanium dibutoxybis(acetylacetonate), titanium tributoxyethylacetoacetate, titanium butoxyacetylacetonate bis(ethylacetoacetate), titanium tetrakis(acetylacetonate), and titanium diacetylacetonate bis(ethylacetoacetate).

Examples thereof further include bis(2-ethylhexanoato)titanium oxide, bis(laurato)titanium oxide, bis(naphthato)titanium oxide, bis(stearato)titanium oxide, bis(oleato)titanium oxide, bis(linolato)titanium oxide, tetrakis(2-ethylhexanoato)titanium, tetrakis(laurato)titanium, tetrakis(naphthato)titanium, tetrakis(stearato)titanium, tetrakis(oleato)titanium, tetrakis(linolato)titanium, tris(2-ethylhexanoato) bismuth, tris(laurato)bismuth, tris(naphthato)bismuth, tris (stearato)bismuth, tris(oleato)bismuth, and tris(linolato) bismuth.

Examples thereof furthermore include tetraethoxyzirconium, tetra-n-propoxyzirconium, tetraisopropoxyzirconium, tetra-n-butoxyzirconium, tetra-sec-butoxyzirconium, tetratert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonate bis (ethylacetoacetate), zirconium tetrakis(acetylacetonate), zirconium diacetylacetonate bis(ethylacetoacetate), bis(2-ethylhexanoato)zirconium oxide, bis(laurato)zirconium oxide, bis(naphthato)zirconium oxide, bis(stearate)zirconium oxide, bis(oleato)zirconium oxide, bis(linolato)zirconium oxide, tetrakis(2-ethylhexanoato)zirconium, tetrakis (laurato)zirconium, tetrakis(naphthato)zirconium, tetrakis (stearato)zirconium, tetrakis(oleato)zirconium, and tetrakis (linolato)zirconium.

Examples thereof still further include triethoxyaluminum, tri-n-propoxyaluminum, triisopropoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris (ethylacetoacetate), tris(2-ethylhexanoato)aluminum, tris (laurato)aluminum, tris(naphthato)aluminum, tris(stearato) aluminum, tris(oleato)aluminum, tris(linolato)aluminum, bis (n-octanoato)tin, bis(2-ethylhexanoato)tin, dilauratotin, dinaphthoatotin, distearatotin, dioleatotin, dibutyltin diacetate, dibutyltin bis(n-octanoate), dibutyltin bis(2-ethylhexanoate), dibutyltin dilaurate, dibutyltin malate, dibutyltin bis (benzylmalate), dibutyltin bis(2-ethylhexylmalate), di-n-octyltin diacetate, di-n-octyltin bis(n-octanoate), di-n-octyltin bis(2-ethylhexanoate), di-n-octyltin dilaurate, di-n-octyltin malate, di-n-octyltin bis(benzylmalate), and di-n-octyltin bis(2-ethylhexylmalate).

Suitable examples, among these condensation catalysts, include tetrakis(2-ethylhexyloxy)titanium, tetra(octanediolato)titanium, tris(2-ethylhexanoato)bismuth, tetra-n-propoxyzirconium, tetra-n-butoxyzirconium, bis(2-ethylhexanoato)zirconium oxide, bis(oleato)zirconium oxide, triisopropoxyaluminum, tri-sec-butoxyaluminum, tris(2-ethylhexanoato)aluminum, tris(stearato)aluminum, zirconium tetrakis(acetylacetonate), aluminum tris(acetylacetonate), bis(2-ethylhexanoato)tin, and di-n-octyltin bis(2-ethylhexylmalate).

The amount of the condensation catalyst for alkoxysilane compounds, which contains a metallic element, to be used in this mixing is preferably from 0.1-10 mole equivalents, more preferably from 0.2-5 mole equivalents, to the alkoxysilyl groups present in the reaction system. In case where the amount thereof is less than 0.1 mole equivalent, the condensation reaction does not proceed sufficiently. On the other hand, even when the condensation catalyst is used in an amount exceeding 10 mole equivalents, the effect of the condensation catalyst in the reaction is not enhanced any more and such a large catalyst amount is undesirable from the standpoint of profitability.

Methods for adding the condensation catalyst, which is a modifier, are not particularly limited, and examples thereof include a method in which the catalyst is added at a time, a method in which the catalyst is added dividedly, and a method in which the catalyst is continuously added. However, the method in which the catalyst is added at a time is preferable. The condensation catalyst may be added in the form of a solution in which the solvent may be any of the hydrocarbon solvents and randomizers which were described hereinabove.

The temperature at which the condensation catalyst is mixed with another ingredient (e.g., the modified conjugated diene polymer obtained in step (a)) is preferably from 0 to 120° C., more preferably from 20 to 100° C. Lower temperatures tend to result in an increase in the viscosity of the polymer, while higher temperatures are apt to result in alteration of the polymerization active ends. Consequently, a temperature within that numerical range is preferable.

The mixing time is preferably from 1 minute to 5 hours, more preferably from 2 minutes to 1 hour. In case where the mixing time is shorter than 1 minute, the mixing is not completed. Meanwhile, even when the mixing time is prolonged beyond 5 hours, the mixing is saturated.

[2] Modified Conjugated Diene Rubber:

The modified conjugated diene rubber of the present invention is a modified conjugated diene rubber obtained by the method of the present invention for producing a modified conjugated diene rubber explained above. The modified conjugated diene rubber has a high Mooney viscosity, excellent shape stability, and satisfactory processability. The Mooney viscosity (ML1+4, 100° C.) of the modified conjugated diene rubber of the present invention is preferably from 30-150, more preferably from 40-120. In case where the Mooney viscosity (ML1+4, 100° C.) thereof is less than 30, shape stability decreases. On the other hand, when the Mooney viscosity (ML1+4, 100° C.) thereof exceeds 150, there are cases where this rubber has impaired workability and is difficult to knead together with compounding ingredients. In this connection, when the rubber has too high a Mooney viscosity, this rubber is usually extended with an extender oil so as to result in a Mooney viscosity within that range. As the extender oil, it is preferable to use an aromatic oil, naphthenic oil, or paraffin oil or to use an aromatic-oil substitute which has a PCA content of 3% by mass or less as determined by the IP 346 method. Although the amount of the extender oil to be used is not limited, the amount thereof is usually 10-50 parts by mass per 100 parts by mass of the polymer. In general, the extender oil is used in an amount of 20-37.5 parts by mass. Suitable oils classified by oil production step are T-DAE (treated distillate aromatic extract) oils, T-RAE (treated residual aromati extract) oils, MES (mild extract solvate) oils, RAE (residual aromatic extract) oils, and the like.

[3] Rubber Composition:

The rubber composition of the present invention contains, as a rubber component, the modified conjugated diene rubber described above. Details thereof are explained below.

[3-1] Rubber Component:

The rubber component in the rubber composition of the present invention includes the modified conjugated diene rubber described above. It is preferable that the proportion of the modified conjugated diene rubber in the rubber component is preferably 20% by mass or higher; it is more preferable that the proportion is 30% by mass or higher; and it is especially preferable that the proportion is 40% by mass or higher. By regulating the proportion thereof to 20% by mass or higher, the crosslinked rubber composition can be rendered more satisfactory in terms of mechanical properties such as tensile strength and tensile elongation, crack growth resistance, and wear resistance.

The modified conjugated diene rubber may include one modified conjugated diene rubber or may include two or more modified conjugated diene rubbers. The rubber component may include other rubber ingredients besides the modified conjugated diene rubber. Examples of the other rubber ingredients include natural rubber, synthetic isoprene rubbers, butadiene rubbers, styrene/butadiene rubbers, ethylene/α-olefin copolymer rubbers, ethylene/α-olefin/diene copolymer rubbers, acrylonitrile/butadiene copolymer rubbers, chloroprene rubbers, halogenated butyl rubbers, styrene/isoprene copolymer rubbers, butadiene/isoprene copolymer rubbers, styrene/butadiene/isoprene random copolymer rubbers, styrene/acrylonitrile/butadiene copolymer rubbers, acrylonitrile/butadiene copolymer rubbers, polystyrene/polybutadiene/polystyrene block copolymers, and mixtures of these rubbers. Even when other known rubber ingredients usable in rubber compositions for tires are contained, a crosslinked rubber having excellent low-hysteresis-loss characteristics can be produced.

[3-2] Other Components (carbon black, silica):

It is preferable that the rubber composition of the present invention should further contain carbon black and/or silica. Examples of the carbon black include furnace black, which is represented by SRF, GPF, FEF, HAF, ISAF, SAF, ISAF-HS, ISAF-LS, IISAF-HS, HAF-HS, and HAF-LS, acetylene black, thermal black, channel black, graphites, graphite fibers, and fullerenes. Carbon black which has an iodine adsorption (IA) of 60 mg/g or more and a dibutyl phthalate absorption (DBP) of 80 mL/100 g or more is preferable. By using carbon black, the effect of improving the grip performance and fracture resistance of the crosslinked rubber composition is enhanced. The HAF, ISAF, and SAF, which bring about excellent wear resistance are specifically preferable. One carbon black can be used above, or two or more carbon blacks can be used in combination.

Examples of the silica include wet-process silica (hydrous silicic acid), dry-process silica (silicic acid anhydride), colloidal silica, precipitated silica, calcium silicate, and aluminum silicate. Among these, wet-process silica, which is most superior in the effect of improving fracture resistance and in the effect of attaining both wet grip performance and low-rolling-resistance characteristics is preferable. It is also preferred to use high dispersible type silica, from the standpoints of properties and processability since the silica has satisfactory dispersibility in rubbers. One silica can be used alone, or two or more silicas can be used in combination.

It is preferable that the rubber composition of the present invention should contain carbon black and/or silica in an amount of 20-130 parts by mass per 100 parts by mass of the rubber component (sum of the modified conjugated diene rubber and other rubber ingredients). From the standpoints of reinforcing properties and the effect of improving various properties which is brought about thereby, it is more preferable that the rubber composition should contain carbon black and/or silica in an amount of 25-110 parts by mass. In case where the proportion of the carbon black and/or silica is low, the effect of improving fracture resistance and other properties tends to be insufficient. In case where the proportion of the carbon black and/or silica is high, the rubber composition tends to have reduced workability. Consequently, it is preferable that the proportion thereof should be within that numerical range. Furthermore, by incorporating a carbon-silica dual phase filler into the rubber composition of the present invention, the same excellent advantages as in the case of using carbon black and silica in combination can be obtained. The carbon-silica dual phase filler is a so-called silica-coated carbon black obtained by chemically binding silica to the surface of carbon black, and is sold by Cabot Corp. under the trade names of CRX2000, CRX2002, and CRX2006. The amount of the carbon-silica dual phase filler to be incorporated is preferably from 1 to 100 parts by mass, more preferably from 5 to 95 parts by mass, per 100 parts by mass of the rubber component.

In the case where silica is incorporated as a reinforcement into the rubber composition of the present invention, it is preferable to incorporate a silane coupling agent in order to further improve the reinforcing effect. Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, vinyltriethoxysilane, β-(3,4-epoxycyclohexyl)ethyltrimethoxysilane, N-(β-aminoethyl)-γ-aminopropyltrimethoxysilane, 3-octathio-1-propyltriethoxysilane, γ-trimethoxysilylpropyldimethylthiocarbamyl tetrasulfide, γ-trimethoxysilylpropylbenzothiazyl tetrasulfide, the mercaptosilane compounds described as examples in JP-A-2006-249069, and commercial products such as trade names "NXT Silane", "NXT-Low-V Silane", and "NXT Ultra Low-V Silane", manufactured by Momentive Performance Materials, Inc., "VP Si363", manufactured by Degussa AG, and 11-mercaptoundecyltrimethoxysilane (manufactured by Gelest Inc.). Suitable of these, from the standpoints of the effect of improving reinforcing properties, etc., are bis(3-triethoxysilylpropyl)polysulfide, 3-trimethoxysilylpropylbenzothiazyl tetrasulfide, and the mercaptosilane compounds described as examples in JP-A-2006-249069. The silane coupling agents can be used alone or in combination of two or more thereof. The amount of the silane coupling agent to be incorporated varies depending on the kind of the silane coupling agent, etc. However, the amount thereof is preferably from 1 to 20 parts by mass, more preferably from 3 to 15 parts by mass, per 100 parts by mass of the silica. In case where the amount thereof is less than 1 part by mass, there is a tendency that the effect of the coupling agent is less apt to be sufficiently produced. On the other hand, in case where the amount thereof exceeds 20 parts by mass, there is a tendency that the rubber component is apt to gel.

Various compounding ingredients for the rubber composition of the present invention are not particularly limited. It is possible to add a compatibilizing agent during kneading for the purpose of improving workability required for kneading or for the purpose of further improving the balance among wet skid resistance, low-hysteresis-loss characteristics, and wear resistance. Preferable examples of the compatibilizing agent include organic compounds selected from compounds containing epoxy, carboxylic acid compounds, carboxylic acid ester compounds, ketone compounds, ether compounds, aldehyde compounds, hydroxyl-containing compounds, and amino-containing compounds and silicone compounds selected from alkoxysilane compounds, siloxane compounds, and aminosilane compounds.

Examples of the organic compounds usable as the compatibilizing agent include compounds containing epoxy, carboxylic acid compounds, carboxylic acid ester compounds, ketone compounds, ether compounds, aldehyde compounds, compounds containing amino and compounds containing hydroxyl.

Examples of these various organic compounds include the following compounds.

Examples of the compounds containing epoxy include butyl glycidyl ether, diglycidyl ether, propylene oxide, neopentyl glycol diglycidyl ether, epoxy resins, epoxidized soybean oil, and epoxidized fatty acid esters.

Examples of the carboxylic acid compounds include adipic acid, octylic acid, and methacrylic acid.

Examples of the carboxylic acid ester compounds include acrylic esters, diethylene acrylate, ethyl methacrylate, orthoacetic esters, acetoacetic esters, butyl acetate, isopropyl acetate, dimethyl carbonate, p-hydroxyphenyl acetate, polyester-based plasticizers, and stearic acid-based plasticizers.

Examples of the ketone compounds include methylcyclohexanone and acetylacetone.

Examples of the ether compounds include isopropyl ether and dibutyl ether.

Examples of the aldehyde compounds include undecylenaldehyde, decyladehyde, valine, 3,4-dimethoxybenzaldehyde, and cuminaldehyde.

Examples of the compounds containing amino include isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, and n-butylamine hydrochloride.

Examples of the compounds containing hydroxyl include isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylenes glycol, dibutylene glycol, and triethylene glycol.

Among these, compounds containing epoxy, compounds containing amino and compounds containing hydroxyl.

Examples of the silicone compounds usable as the compatibilizing agent include alkoxysilane compounds, siloxane compounds, and aminosilane compounds.

Examples of these various silicone compounds include the following compounds.

Examples of the alkoxysilane compounds include trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane etc.

Examples of the siloxane compounds include dimethylsiloxane oligomers, silicone oils, amino-modified silicone oils, epoxy-modified silicone oils, carboxyl-modified silicone oils, polyether-modified silicone oils, alkyl-modified silicone oils, silicone oils modified with a higher fatty acid ester, higher-alkoxy-modified silicone oils, silicone oils containing a higher fatty acid etc.

Examples of the aminosilane compounds include hexamethyldisilazane, nonamethyltrisilazane, anilitrimethylsilane, bis(dimethylamino)dimethylsilane, bis(diethylamino)dimethylsilane, triethylaminosilane etc.

Among these, the silazane compounds and bis(dimethylamino)dimethylsilane are preferable.

Various kinds of chemicals, additives, etc. which are in general use in the rubber industry can be incorporated into the rubber composition of the present invention according to need so long as the incorporation thereof does not impair the objects of the present invention. Examples of various chemicals, additives, etc. which can be incorporated into the rubber composition of the present invention include a crosslinking agent (e.g., vulcanizing agent), vulcanization aid, processing aid, vulcanization accelerator, process oil, antioxidant, scorch retarder, zinc white, and stearic acid.

Examples of the vulcanizing agent include sulfur, sulfur halides, organic peroxides, quinone dioxime compounds, organic polyvalent amine compounds, and alkylphenol resins having methylol groups. However, sulfur is usually used. The amount of the vulcanizing agent to be used is preferably from 0.1 to 5 parts by mass, more preferably from 0.5 to 3 parts by mass, per 100 parts by mass of the modified conjugated diene rubber (raw rubber; rubber component).

As the vulcanization aid and processing aid, stearic acid is generally used. The amount of the vulcanization aid and processing aid to be used is generally from 0.5-5 parts by mass per 100 parts by mass of the modified conjugated diene rubber.

The vulcanization accelerator is not particularly limited. Examples thereof include sulfenamide, guanidine, thiuram, thiourea, thiazole, dithiocarbamic acid, and xanthogenic acid compounds. Preferred examples thereof include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, di-o-tolylguanidine, and o-tolylbiguanidine. The amount of the vulcanization accelerator to be used is generally from 0.1 to 5 parts by mass, preferably from 0.4 to 4 parts by mass, per 100 parts by mass of the modified conjugated diene rubber.

The rubber composition of the present invention can be produced by kneading with using a kneading machine such as, for example, an open type kneading machine, e.g., a roll mill, or a closed type kneading machine, e.g., a Banbury mixer. The rubber composition is rendered applicable to various rubber products by molding and then crosslinking (vulcanizing) the rubber composition. The crosslinked rubber composition of the present invention (the rubber composition which has been crosslinked) is suitable for use in tire applications such as tire treads, under-treads, carcasses, side walls, and beads and in applications such as vibration-damping rubbers, fender materials, belts, hoses, and other industrial products. The crosslinked rubber composition of the present invention is especially suitable for use as a rubber for tire treads.

In the present invention, each of the modified conjugated diene polymer (the product of step (a)), the modified conjugated diene rubber (the product of step (b)), the rubber composition, and the crosslinked rubber composition has the following properties.

The conjugated diene polymer which has not been modified has a weight-average molecular weight, as determined by gel permeation chromatography (GPC) and calculated for standard polystyrene, of preferably from 10,000-1,500,000, more preferably from 50,000-1,000,000, especially preferably from 100,000-800,000, from the standpoint of maintaining a balance between the shape stability of the modified conjugated diene rubber and the workability required for producing a rubber composition.

It is preferable that the modified conjugated diene rubber has a glass transition temperature of 0° C. or lower; it is more preferable that the temperature is −5° C. or lower; ant it is especially preferable that the temperature is −10° C. or lower, from the standpoint of maintaining a balance between the low-hysteresis-loss characteristics and wet skid resistance of the crosslinked rubber composition to be obtained.

The modified conjugated diene rubber has a Mooney viscosity (ML1+4, 100° C.) of preferably from 30-150, more preferably from 40-120, from the standpoint of maintaining a balance between the shape stability of the modified conjugated diene rubber and the workability required for producing a rubber composition.

It is preferable that the modified conjugated diene rubber has a cold flow value (mg/min) of 1.5 or less; it is more preferable that the value is 1.0 or less; and it is especially preferable that the value is 0.5 or less, from the standpoint of the shape stability of the modified conjugated diene rubber.

The rubber composition has a Mooney viscosity (ML1+4, 100° C.) of preferably from 20-150, more preferably from 30-130, especially preferably from 40-110, from the standpoint of the workability required for tire production.

The crosslinked rubber composition has an index of tensile strength (JIS K 6310; 300% modulus) of preferably 101 or larger, more preferably 103 or larger.

The crosslinked rubber composition has an index of tan δ at 0° C. of preferably 115 or larger, more preferably 120 or larger.

The crosslinked rubber composition has an index of tan δ at 70° C. of preferably 110 or larger, more preferably 120 or larger.

The crosslinked rubber composition has an index of wear resistance (JIS K 6264; load, 10 N; 25° C.) of preferably 102 or larger; more preferably 105 or larger; especially preferably 107 or larger.

EXAMPLES

Although the present invention will be explained below in detail by references to Examples, the present invention should not be construed as being limited to the following Examples. In the Examples and Comparative Examples, "parts" and "%" are by mass unless otherwise indicated. The methods used for determining the values of various properties are shown below.

[Combined Styrene Content (%)]: The content was determined by 500-MHz 1H-NMR spectroscopy.

[Vinyl Content (%)]: The content was determined by 500-MHz 1H-NMR spectroscopy.

[Glass Transition Temperature (° C.)]: The temperature was measured in accordance with ASTM D3418.

[Weight-Average Molecular Weight before Modification]: The molecular weight, calculated for standard polystyrene, was determined from the retention time corresponding to the top of the maximum peak in a GPC curve obtained using a gel permeation chromatograph (GPC) (HLC-8120GPC (trade name (manufactured by Tosoh Corp.))).

(Conditions of the GPC)

Columns: two columns; trade name "GMHXL" (manufactured by Tosoh Corp.)

Column temperature: 40° C.

Eluent: tetrahydrofuran (THF)

Flow rate: 1.0 mL/min

Sample concentration: 10 mg/20 mL

[Mooney Viscosity (ML1+4, 100° C.)]: The viscosity was determined in accordance with JIS K6300 using rotor L under the conditions of a preheating period of 1 minute, a rotor operation period of 4 minutes, and a temperature of 100° C.

[Cold Flow Value]: A copolymer (rubber) was held at a temperature of 50° C. and extruded through a 6.35-mm orifice under the conditions of a pressure of 24.1 kPa. After passing 10 minutes since initiation of the extrusion (i.e., after the extrusion rate had become constant), the amount (mg) of the copolymer extruded in every 30 minutes was measured over 90 minutes. An average thereof was taken as cold flow value (mg/min). The larger the value is, the poorer shape stability of the rubber becomes and the more difficulty is caused in the rubber handling.

Example 1

Synthesis of Modified Conjugated-Diene Rubber a and Evaluation Thereof

Into an autoclave reactor which had a capacity of 5 L and in which the atmosphere had been replaced by nitrogen, 2,750 g of cyclohexane, 50.0 g of tetrahydrofuran, 125 g of styrene, and 365 g of 1,3-butadiene were added. The temperature of the contents of the reactor was regulated to 10° C. Thereafter, a cyclohexane solution containing n-butyllithium (5.80 mmol) was added thereto to initiate polymerization. The polymerization was conducted under adiabatic conditions, and the maximum temperature reached 85° C.

Ten grams of butadiene was supplemented at the time when the conversion into polymer had reached 99%, and the monomers were polymerized for further 5 minutes. Thereafter, 10 g of the resultant polymer solution was sampled to take out for molecular-weight determination before modification. A cyclohexane solution containing N,N-bis(triethylsilyl)aminopropyltrimethoxysilane (4.96 mmol) was added, and the resultant mixture was reacted for 15 minutes. To the resultant polymer solution, a cyclohexane solution containing 3-aminopropyltriethoxysilane (4.96 mmol) was added. This mixture was mixed for 5 minutes. Thereafter, a cyclohexane solution containing bis(2-ethylhexanoato)tin (4.96 mmol) was further added, and this mixture was mixed for 5 minutes. Subsequently, 2.0 g of 2,6-di-tert-butyl-p-cresol was added to the polymer solution obtained. Steam stripping was then conducted using hot water having a pH adjusted to 11 with sodium hydroxide, thereby removing the solvent, and the rubber was dried with heated rolls having a temperature regulated to 110° C. Thus, modified conjugated diene rubber A was obtained.

The polymerization recipe for modified conjugated diene rubber A is shown in Table 1, and properties of the modified conjugated diene rubber A obtained are shown in Table 2. Furthermore, a rubber composition prepared using modified conjugated diene rubber A according to the formulation shown in Table 3 and Table 4 was vulcanized and evaluated for properties. The results thereof are shown in Table 4.

Example 2

Synthesis of Modified Conjugated Diene Rubber B and Evaluation Thereof

Modified conjugated diene rubber B was obtained in the same manner as in Example 1, except that N,N-bis(triethylsilyl)aminopropylmethyldimethoxysilane was used in place of the N,N-bis(triethylsilyl)aminopropyltrimethoxysilane.

The polymerization recipe for modified conjugated diene rubber B is shown in Table 1, and properties of the modified conjugated diene rubber B obtained are shown in Table 2. Furthermore, a rubber composition prepared using modified conjugated diene rubber B according to the formulation shown in Table 3 and Table 4 was vulcanized and evaluated for properties. The results thereof are shown in Table 4.

Example 3

Synthesis of Modified Conjugated Diene Rubber C and Evaluation Thereof

Modified conjugated diene rubber C was obtained in the same manner as in Example 1, except that N,N-bis(trimethylsilyl)aminopropyltriethoxysilane was used in place of the N,N-bis(triethylsilyl)aminopropyltrimethoxysilane.

The polymerization recipe for modified conjugated diene rubber C is shown in Table 1, and properties of the modified conjugated diene rubber C obtained are shown in Table 2. Furthermore, a rubber composition prepared using modified conjugated diene rubber C according to the formulation shown in Table 3 and Table 4 was vulcanized and evaluated for properties. The results thereof are shown in Table 4.

Example 4

Synthesis of Modified Conjugated-Diene Rubber D and Evaluation Thereof

Into an autoclave reactor which had a capacity of 5 L and in which the atmosphere had been replaced by nitrogen, 2,750 g of cyclohexane, 10.3 g of tetrahydrofuran, 50 g of styrene, and 440 g of 1,3-butadiene were added. The temperature of the contents of the reactor was regulated to 10° C. Thereafter, a cyclohexane solution containing n-butyllithium (5.80 mmol) was added thereto to initiate polymerization. The polymerization was conducted under adiabatic conditions, and the maximum temperature reached 90° C.

Ten grams of butadiene was supplemented at the time when the conversion into polymer had reached 99%, and the monomers were polymerized for further 5 minutes. Thereafter, 10 g of the resultant polymer solution was sampled for molecular-weight determination before modification. A cyclohexane solution containing 1-(3-triethoxysilylpropyl)-2,2,5,5-tetramethyl 1-aza-2,5-disilacyclopentane (4.96 mmol) was added, and the resultant mixture was reacted for 15 minutes. To the resultant polymer solution was added a cyclohexane solution containing 3-aminopropyltriethoxysilane (4.96 mmol). This mixture was mixed for 5 minutes. Thereafter, a cyclohexane solution containing tetrakis(2-ethylhexyloxy)titanium (4.96 mmol) was further added, and this mixture was mixed for 5 minutes. Subsequently, 2.0 g of 2,6-di-tert-butyl-p-cresol was added to the polymer solution obtained. Steam stripping was then conducted using hot water having a pH adjusted to 10 with sodium hydroxide, thereby removing the solvent, and the rubber was dried with heated rolls having a temperature regulated to 110° C. Thus, modified conjugated-diene rubber D was obtained.

The polymerization recipe for modified conjugated-diene rubber D is shown in Table 1, and properties of the modified conjugated-diene rubber D obtained are shown in Table 2. Furthermore, a rubber composition prepared using modified conjugated-diene rubber D according to the formulation shown in Table 3 and Table 4 was vulcanized and evaluated for properties. The results thereof are shown in Table 4.

Example 5

Synthesis of Modified Conjugated-Diene Rubber E and Evaluation Thereof

Modified conjugated-diene rubber E was obtained in the same manner as in Example 1, except that N-[3-(trimethoxysilyl)propyl]-N,N'-diethyl-N'-trimethylsilyl-ethane-1,2-diamine was used in place of the N,N-bis(triethylsilyl)aminopropyltrimethoxysilane and that zirconium tetrakis(acetylacetonate) was used in place of the bis(2-ethylhexanoato)tin.

The polymerization recipe for modified conjugated-diene rubber E is shown in Table 1, and properties of the modified conjugated-diene rubber E obtained are shown in Table 2. Furthermore, a rubber composition prepared using modified conjugated-diene rubber E according to the formulation shown in Table 3 and Table 4 was vulcanized and evaluated for properties. The results thereof are shown in Table 4.

Example 6

Synthesis of Modified Conjugated-Diene Rubber F and Evaluation Thereof

Modified conjugated-diene rubber F was obtained in the same manner as in Example 5, except that 3-(4-trimethylsilyl-1-piperazino)propyltriethoxysilane was used in place of the N-[3-(trimethoxysilyl)propyl]-N,N'-diethyl-N'-trimethylsilyl-ethane-1,2-diamine.

The polymerization recipe for modified conjugated-diene rubber F is shown in Table 1, and properties of the modified conjugated-diene rubber F obtained are shown in Table 2. Furthermore, a rubber composition prepared using modified conjugated-diene rubber F according to the formulation shown in Table 3 and Table 4 was vulcanized and evaluated for properties. The results thereof are shown in Table 4.

Example 7

Synthesis of Modified Conjugated-Diene Rubber G and Evaluation Thereof

Modified conjugated-diene rubber G was obtained in the same manner as in Example 1, except that S-trimethylsilylmercaptopropyltriethoxysilane was used in place of the N,N-bis(triethylsilyl)aminopropyltrimethoxysilane.

The polymerization recipe for modified conjugated-diene rubber G is shown in Table 1, and properties of the modified conjugated-diene rubber G obtained are shown in Table 2. Furthermore, a rubber composition prepared using modified conjugated-diene rubber G according to the formulation shown in Table 3 and Table 4 was vulcanized and evaluated for properties. The results thereof are shown in Table 4.

Example 8

Synthesis of Modified Conjugated-Diene Rubber H and Evaluation Thereof

Modified conjugated-diene rubber H was obtained in the same manner as in Example 1, except that mercaptopropyltriethoxysilane was used in place of the 3-aminopropyltriethoxysilane.

The polymerization recipe for modified conjugated-diene rubber H is shown in Table 1, and properties of the modified conjugated-diene rubber H obtained are shown in Table 2. Furthermore, a rubber composition prepared using modified conjugated-diene rubber H according to the formulation shown in Table 3 and Table 4 was vulcanized and evaluated for properties. The results thereof are shown in Table 4.

Example 9

Synthesis of Modified Conjugated-Diene Rubber I and Evaluation Thereof

Modified conjugated-diene rubber I was obtained in the same manner as in Example 1, except that 3.25 mmol of 2,2-di(tetrahydrofuryl)propane was used in place of the 50.0 g of tetrahydrofuran and that N-2-(aminoethyl)-3-aminopropylmethyldimethoxysilane was used in place of the 3-aminopropyltriethoxysilane.

The polymerization recipe for modified conjugated-diene rubber I is shown in Table 1, and properties of the modified conjugated-diene rubber I obtained are shown in Table 2. Furthermore, a rubber composition prepared using modified conjugated-diene rubber I according to the formulation shown in Table 3 and Table 4 was vulcanized and evaluated for properties. The results thereof are shown in Table 4.

Example 10

Synthesis of Modified Conjugated-Diene Rubber J and Evaluation Thereof

Modified conjugated-diene rubber J was obtained in the same manner as in Example 1, except that 3.25 mmol of 2,2-di(tetrahydrofuryl)propane was used in place of the 50.0 g of tetrahydrofuran and that the addition amount of 3-aminopropyltriethoxysilane was changed from 4.96 mmol to 9.92 mmol.

The polymerization recipe for modified conjugated-diene rubber J is shown in Table 1, and properties of the modified conjugated-diene rubber J obtained are shown in Table 2. Furthermore, a rubber composition prepared using modified conjugated-diene rubber J according to the formulation shown in Table 3 and Table 4 was vulcanized and evaluated for properties. The results thereof are shown in Table 4.

Example 11

Synthesis of Modified Conjugated-Diene Rubber K and Evaluation Thereof

Into an autoclave reactor which had a capacity of 5 L and in which the atmosphere had been replaced by nitrogen, 2,750 g of cyclohexane, 100.0 g of tetrahydrofuran, 180 g of styrene, and 310 g of 1,3-butadiene were added. The temperature of the contents of the reactor was regulated to 20° C. Thereafter, a cyclohexane solution containing n-butyllithium (4.60 mmol) was added thereto to initiate polymerization. The polymerization was conducted under adiabatic conditions, and the maximum temperature reached 85° C.

Ten grams of butadiene was supplemented at the time when the conversion into polymer had reached 99%, and the monomers were polymerized for further 5 minutes. Thereafter, 10 g of the resultant polymer solution was sampled for molecular-weight determination before modification. A cyclohexane solution containing N,N-bis(triethylsilyl)aminopropyltrimethoxysilane (3.93 mmol) was added, and the resultant mixture was reacted for 15 minutes. To the resultant polymer solution, a cyclohexane solution containing 3-aminopropyltriethoxysilane (3.93 mmol) was added. This mixture was mixed for 5 minutes. Thereafter, a cyclohexane solution containing zirconium tetrakis(acetylacetonate) (4.96 mmol) was further added, and this mixture was mixed for 5 minutes. Subsequently, 2.0 g of 2,6-di-tert-butyl-p-cresol was added to the polymer solution obtained, and 187.5 g of a naphthenic oil (trade name SNH46, manufactured by Sankyo Yuka Kogyo K.K.) was thereafter added thereto. This mixture was mixed for 5 minutes. Steam stripping was then conducted using hot water having a pH adjusted to 9 with sodium hydroxide, thereby removing the solvent, and the rubber was dried with heated rolls having a temperature regulated to 110° C. Thus, modified conjugated-diene rubber K was obtained.

The polymerization recipe for modified conjugated-diene rubber K is shown in Table 1, and properties of the modified conjugated-diene rubber K obtained are shown in Table 2. Furthermore, a rubber composition prepared using modified conjugated-diene rubber K according to the formulation shown in Table 3 and Table 4 was vulcanized and evaluated for properties. The results thereof are shown in Table 4.

Example 12

Synthesis of Modified Conjugated-Diene Rubber L and Evaluation Thereof

Modified conjugated-diene rubber L was obtained in the same manner as in Example 4, except that 1-(3-triethoxysilylpropyl)-2,2,5,5-tetramethyl-1-aza-2,5-disilacyclopentane was added first, tetrakis(2-ethylhexyloxy)titanium was added next, and 3-aminopropyltriethoxysilane was added finally.

The polymerization recipe for modified conjugated-diene rubber L is shown in Table 1, and properties of the modified conjugated-diene rubber L obtained are shown in Table 2. Furthermore, a rubber composition prepared using modified conjugated-diene rubber L according to the formulation shown in Table 3 and Table 4 was vulcanized and evaluated for properties. The results thereof are shown in Table 4.

Example 13

Synthesis of Modified Conjugated-Diene Rubber M and Evaluation Thereof

Modified conjugated-diene rubber M was obtained in the same manner as in Example 4, except that 1-(3-triethoxysilylpropyl)-2,2,5,5-tetramethyl-1-aza-2,5-disilacyclopentane was added first and tetrakis(2-ethylhexyloxy)titanium and 3-aminopropyltriethoxysilane were subsequently added simultaneously.

The polymerization recipe for modified conjugated-diene rubber M is shown in Table 1, and properties of the modified conjugated-diene rubber M obtained are shown in Table 2. Furthermore, a rubber composition prepared using modified conjugated-diene rubber M according to the formulation shown in Table 3 and Table 4 was vulcanized and evaluated for properties. The results thereof are shown in Table 4.

Comparative Example 1

Synthesis of Modified Conjugated-Diene Rubber N and Evaluation Thereof

Modified conjugated-diene rubber N was obtained in the same manner as in Example 1, except that the N,N-bis(triethylsilyl)aminopropyltrimethoxysilane was not added.

The polymerization recipe for modified conjugated-diene rubber N is shown in Table 1, and properties of the modified conjugated-diene rubber N obtained are shown in Table 2. Furthermore, a rubber composition prepared using modified conjugated-diene rubber N according to the formulation shown in Table 3 and Table 4 was vulcanized and evaluated for properties. The results thereof are shown in Table 4.

Comparative Example 2

Synthesis of Modified Conjugated-Diene Rubber O and Evaluation Thereof

Modified conjugated-diene rubber O was obtained in the same manner as in Example 1, except that the 3-aminopropyltriethoxysilane was not added.

The polymerization recipe for modified conjugated-diene rubber O is shown in Table 1, and properties of the modified conjugated-diene rubber O obtained are shown in Table 2. Furthermore, a rubber composition prepared using modified conjugated-diene rubber O according to the formulation shown in Table 3 and Table 4 was vulcanized and evaluated for properties. The results thereof are shown in Table 4.

Comparative Example 3

Synthesis of Modified Conjugated-Diene Rubber P and Evaluation Thereof

Modified conjugated-diene rubber P was obtained in the same manner as in Example 11, except that the 3-aminopropyltriethoxysilane was not added.

The polymerization recipe for modified conjugated-diene rubber P is shown in Table 1, and properties of the modified conjugated-diene rubber P obtained are shown in Table 2. Furthermore, a rubber composition prepared using modified conjugated-diene rubber P according to the formulation shown in Table 3 and Table 4 was vulcanized and evaluated for properties. The results thereof are shown in Table 4.

Comparative Example 4

Synthesis of Modified Conjugated-Diene Rubber Q and Evaluation Thereof

Modified conjugated-diene rubber Q was obtained in the same manner as in Example 1, except that tetraethoxysilane was used in place of the N,N-bis(triethylsilyl)aminopropyltrimethoxysilane.

The polymerization recipe for modified conjugated-diene rubber Q is shown in Table 1, and properties of the modified conjugated-diene rubber Q obtained are shown in Table 2. Furthermore, a rubber composition prepared using modified conjugated-diene rubber Q according to the formulation shown in Table 3 and Table 4 was vulcanized and evaluated for properties. The results thereof are shown in Table 4.

[Method for Kneading Rubber Composition and Property Evaluation]

Plastomill (capacity, 250 cc) equipped with a temperature controller was used to conduct first-stage kneading in which the modified conjugated-diene rubber obtained in each of the Examples and Comparative Examples was kneaded together with an extender oil, carbon black, silica, a silane coupling agent, stearic acid, an antioxidant, and zinc white in accordance with the formulation shown in Table 3 and Table 4, under the conditions of a degree of charging of 72% and a rotation speed of 60 rpm. Subsequently, the mixture thus obtained was cooled to room temperature and then subjected to second-stage kneading in which the mixture was kneaded together with sulfur and vulcanization accelerators in accordance with the formulation shown in Tables 3 and 4. The resultant composition was molded and vulcanized with a vulcanizing press at 160° C. for a given period. The composition was evaluated for the following properties, which indicate tire performance.

(i) Mooney Viscosity: The rubber composition which had not been vulcanized was examined as a test sample in accordance with JIS K6300 using rotor L under the conditions of a preheating period of 1 minute, a rotor operation period of 4 minutes, and a temperature of 100° C.

(ii) Tensile Strength: In accordance with JIS K6301, 300% modulus was determined. The modulus was expressed by an index. The larger value of the index is, the higher the tensile strength becomes and the better the rubber composition was obtained.

(iii) 0° C. tan δ: The vulcanized rubber was examined as a test sample using a dynamic spectrometer (manufactured by Rheometric Inc., USA) under the conditions of a dynamic tensile strain of 0.14%, an angular speed of 100 radians per second, and 0° C. This property was expressed by an index. The larger value of the index is, the higher the resistance to wet skidding becomes and the better the wet skid resistance was shown.

(iv) 70° C. tan δ: The vulcanized rubber was examined as a test sample using a dynamic spectrometer (manufactured by Rheometric Inc., USA) under the conditions of a dynamic tensile strain of 0.7%, an angular speed of 100 radians per second, and 70° C. This property was expressed by an index. The larger value of the index is, the lower hysteresis loss becomes and the better low-hysteresis-loss characteristics was shown.

(v) Wear Resistance: The vulcanized rubber was examined as a test sample using a DIN abrasion tester (manufactured by Toyo Seiki Seisaku-Sho, Ltd.) in accordance with JIS K 6264 at 25° C. under a load of 10 N. This property was expressed by an index. The larger value of the index is, the better wear resistance was shown.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Kind of modified conjugated-diene rubber | A | B | C | D | E | F | G | H | I |
| Polymerization recipe | | | | | | | | | |
| Solvent | | | | | | | | | |
| :Cyclohexane (g) | 2750 | 2750 | 2750 | 2750 | 2750 | 2750 | 2750 | 2750 | 2750 |

TABLE 1-continued

| Vinyl content regulators | | | | | | | | | |
|---|---|---|---|---|---|---|---|---|---|
| :Tetrahydrofuran (g) | 50.0 | 50.0 | 50.0 | 10.3 | 50.0 | 50.0 | 50.0 | 50.0 | — |
| :2,2-Di(tetrahydrofuryl)propane (mmol) | — | — | — | — | — | — | — | — | 3.25 |
| Monomers | | | | | | | | | |
| Styrene (g) | 125 | 125 | 125 | 50 | 125 | 125 | 125 | 125 | 125 |
| Butadiene (g) | 365 | 365 | 365 | 440 | 365 | 365 | 365 | 365 | 365 |
| Supplemental butadiene (g) | 10 | 10 | 10 | 10 | 10 | 10 | 10 | 10 | 10 |
| Polymerization initiator | | | | | | | | | |
| n-Butyllithium (mmol) | 5.80 | 5.80 | 5.80 | 5.80 | 5.80 | 5.80 | 5.80 | 5.80 | 5.80 |
| First alkoxysilane compounds | | | | | | | | | |
| :N—Si-1 *1 (mmol) | 4.96 | — | — | — | — | — | — | 4.96 | 4.96 |
| :N—Si-2 *2 (mmol) | — | 4.96 | — | — | — | — | — | — | — |
| :N—Si-3 *3 (mmol) | — | — | 4.96 | — | — | — | — | — | — |
| :N—Si-4 *4 (mmol) | — | — | — | 4.96 | — | — | — | — | — |
| :N—Si-5 *5 (mmol) | — | — | — | — | 4.96 | — | — | — | — |
| :N—Si-6 *6 (mmol) | — | — | — | — | — | 4.96 | — | — | — |
| :S—Si-1 *7 (mmol) | — | — | — | — | — | — | 4.96 | — | — |
| :Si-1 *8 (mmol) | — | — | — | — | — | — | — | — | — |
| Second alkoxysilane compounds | | | | | | | | | |
| :N-1 *9 (mmol) | 4.96 | 4.96 | 4.96 | 4.96 | 4.96 | 4.96 | 4.96 | — | — |
| :N-2 *10 (mmol) | — | — | — | — | — | — | — | — | 4.96 |
| :S-1 *11 (mmol) | — | — | — | — | — | — | — | 4.96 | — |
| Condensation catalysts | | | | | | | | | |
| :Sn-1 *12 (mmol) | 4.96 | 4.96 | 4.96 | — | — | — | 4.96 | 4.96 | 4.96 |
| :Zr-1 *13 (mmol) | — | — | — | — | 4.96 | 4.96 | — | — | — |
| :Ti-1 *14 (mmol) | — | — | — | 4.96 | — | — | — | — | — |
| Extender oil | | | | | | | | | |
| Oil *15 (g) | — | — | — | — | — | — | — | — | — |

| | Example 10 | Example 11 | Example 12 | Example 13 | Comparative Example 1 | Comparative Example 2 | Comparative Example 3 | Comparative Example 4 |
|---|---|---|---|---|---|---|---|---|
| Kind of modified conjugated-diene rubber | J | K | L | M | N | O | P | Q |
| Polymerization recipe | | | | | | | | |
| Solvent | | | | | | | | |
| :Cyclohexane (g) | 2750 | 2750 | 2750 | 2750 | 2750 | 2750 | 2750 | 2750 |
| Vinyl content regulators | | | | | | | | |
| :Tetrahydrofuran (g) | — | 100.0 | 10.3 | 10.3 | 50.0 | 50.0 | 100.0 | 50.0 |
| :2,2-Di(tetrahydrofuryl)propane (mmol) | 3.25 | — | — | — | — | — | — | — |
| Monomers | | | | | | | | |
| Styrene (g) | 125 | 180 | 50 | 50 | 125 | 125 | 180 | 125 |
| Butadiene (g) | 365 | 310 | 440 | 440 | 365 | 365 | 310 | 365 |
| Supplemental butadiene (g) | 10 | 10 | 10 | 10 | 10 | 10 | 10 | 10 |
| Polymerization initiator | | | | | | | | |
| n-Butyllithium (mmol) | 5.80 | 4.60 | 5.80 | 5.80 | 5.80 | 5.80 | 4.60 | 5.80 |
| First alkoxysilane compounds | | | | | | | | |
| :N—Si-1 *1 (mmol) | 4.96 | 3.93 | — | — | — | 4.96 | 3.93 | — |
| :N—Si-2 *2 (mmol) | — | — | — | — | — | — | — | — |
| :N—Si-3 *3 (mmol) | — | — | — | — | — | — | — | — |
| :N—Si-4 *4 (mmol) | — | — | 4.96 | 4.96 | — | — | — | — |
| :N—Si-5 *5 (mmol) | — | — | — | — | — | — | — | — |
| :N—Si-6 *6 (mmol) | — | — | — | — | — | — | — | — |
| :S—Si-1 *7 (mmol) | — | — | — | — | — | — | — | — |
| :Si-1 *8 (mmol) | — | — | — | — | — | — | — | 4.96 |
| Second alkoxysilane compounds | | | | | | | | |
| :N-1 *9 (mmol) | 9.92 | 3.93 | 4.96 | 4.96 | 4.96 | — | — | 4.96 |
| :N-2 *10 (mmol) | — | — | — | — | — | — | — | — |
| :S-1 *11 (mmol) | — | — | — | — | — | — | — | — |

TABLE 1-continued

| Condensation catalysts | | | | | | | | |
|---|---|---|---|---|---|---|---|---|
| :Sn-1 *12 (mmol) | 4.96 | — | — | — | 4.96 | 4.96 | — | 4.96 |
| :Zr-1 *13 (mmol) | — | 4.96 | — | — | — | — | 4.96 | — |
| :Ti-1 *14 (mmol) | — | — | 4.96 | 4.96 | — | — | — | — |
| Extender oil | | | | | | | | |
| Oil *15 (g) | — | 187.5 | — | — | — | — | 187.5 | — |

*1; N,N-bis(triethylsilyl)aminopropyltrimethoxysilane
*2; N,N-bis(triethylsilyl)aminopropylmethyldimethoxysilane
*3; N,N-bis(trimethylsilyl)aminopropyltriethoxysilane
*4; 1-(3-triethoxysilylpropyl)-2,2,5,5-tetramethyl-1-aza-2,5-disilacyclopentane
*5; N-[3-(trimethyoxysilyl)propyl]-N,N'-diethyl-N'-trimethylsilyl-ethane-1,2-diamine
*6; 3-(4-trimethylsilyl-1-piperazino)propyltriethoxysilane
*7; S-trimethylsilylmercaptopropyltriethoxysilane
*8; tetraethoxysilane
*9; 3-aminopropyltriethoxysilane
*10; N-2-(aminoethyl)-3-aminopropylmethyldimethoxysilane
*11; mercaptopropyltriethoxysilane
*12; bis(2-ethylhexanoato)tin
*13; zirconium tetrakis(acetylacetonate)
*14; tetrakis(2-ethylhexyloxy)titanium
*15; naphthenic oil (PCA, below 3%)

TABLE 2

| | Example 1 | Example 2 | Example 3 | Example 4 | Example 5 | Example 6 | Example 7 | Example 8 | Example 9 |
|---|---|---|---|---|---|---|---|---|---|
| Kind of modified conjugated-diene rubber | A | B | C | D | E | F | G | H | I |
| [Properties of conjugated-diene rubber] | | | | | | | | | |
| Combined styrene content (mass %) | 25 | 25 | 25 | 10 | 25 | 25 | 25 | 25 | 25 |
| Vinyl content (%) | 55 | 56 | 54 | 40 | 55 | 56 | 55 | 55 | 54 |
| Glass transition temperature (° C.) | −30 | −30 | −31 | −61 | −30 | −31 | −30 | −31 | −31 |
| Weight-average molecular weight before modification (×10000) | 19 | 20 | 20 | 20 | 19 | 19 | 19 | 20 | 19 |
| Mooney viscosity (ML1 + 4, 100° C.) | 56 | 43 | 53 | 54 | 58 | 52 | 53 | 68 | 61 |
| Cold flow value (mg/min) | 0.3 | 0.5 | 0.3 | 0.3 | 0.4 | 0.4 | 0.4 | 0.2 | 0.3 |

| | Example 10 | Example 11 | Example 12 | Example 13 | Comparative Example 1 | Comparative Example 2 | Comparative Example 3 | Comparative Example 4 |
|---|---|---|---|---|---|---|---|---|
| Kind of modified conjugated-diene rubber | J | K | L | M | N | O | P | Q |
| [Properties of conjugated-diene rubber] | | | | | | | | |
| Combined styrene content (mass %) | 25 | 36 | 10 | 10 | 25 | 25 | 36 | 25 |
| Vinyl content (%) | 56 | 63 | 41 | 41 | 56 | 54 | 62 | 54 |
| Glass transition temperature (° C.) | −30 | −13 | −61 | −61 | −31 | −30 | −14 | −31 |
| Weight-average molecular weight before modification (×10000) | 19 | 28 | 19 | 20 | 19 | 20 | 28 | 19 |
| Mooney viscosity (ML1 + 4, 100° C.) | 64 | 58 | 53 | 56 | 10 | 51 | 49 | 74 |
| Cold flow value (mg/min) | 0.2 | 0.3 | 0.3 | 0.3 | ≧10 | 0.3 | 0.5 | 0.1 |

TABLE 3

| | Formulation (phr) | |
|---|---|---|
| | I | II |
| Modified conjugated-diene rubber | 100 | 137.5 |
| Extender oil *1) | 37.5 | 0 |
| Carbon black *2) | 5.6 | 5.6 |
| Silica *3) | 80 | 80 |
| Silane coupling agent *4) | 5.6 | 5.6 |
| Stearic acid | 2.0 | 2.0 |
| Antioxidant *5) | 1.0 | 1.0 |
| Zinc oxide | 3.0 | 3.0 |
| Vulcanization accelerator CZ *6) | 1.8 | 1.8 |
| Vulcanization accelerator D *7) | 1.5 | 1.5 |
| Sulfur | 1.5 | 1.5 |

*1) SNH46, manufactured by Sankyo Yuka Kogyo K.K.
*2) DIABLACK N339, manufactured by Mitsubishi Chemical Corp.
*3) Nipsil AQ, manufactured by Tosho Silica Corp.
*4) Si69, manufactured by Evonic
*5) Nocrac 810NA, manufactured by Ouchi-Shinko Chemical Industrial Co., Ltd.
*6) Nocceler CZ, manufactured by Ouchi-Shinko Chemical Industrial Co., Ltd.
*7) Nocceler D, manufactured by Ouchi-Shinko Chemical Industrial Co., Ltd.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Kind of modified conjugated-diene rubber | A | B | C | D | E | F | G | H | I |
| [Properties of crosslinked rubber composition] | | | | | | | | | |
| Formulation | I | I | I | I | I | I | I | I | I |
| Mooney viscosity (ML1 + 4, 100° C.) | 74 | 78 | 72 | 68 | 69 | 71 | 73 | 82 | 73 |
| Tensile strength (index) | 102 | 104 | 105 | 102 | 104 | 105 | 103 | 108 | 104 |
| 0° C. tanδ (index) | 125 | 124 | 123 | 115 | 115 | 118 | 121 | 125 | 128 |
| 70° C. tanδ (index) | 124 | 122 | 124 | 132 | 114 | 119 | 115 | 121 | 127 |
| Wear resistance (index) | 106 | 107 | 105 | 111 | 102 | 106 | 105 | 107 | 103 |

|  | Example 10 | Example 11 | Example 12 | Example 13 | Comparative Example 1 | Comparative Example 2 | Comparative Example 3 | Comparative Example 4 |
|---|---|---|---|---|---|---|---|---|
| Kind of modified conjugated-diene rubber | J | K | L | M | N | O | P | Q |
| [Properties of crosslinked rubber composition] | | | | | | | | |
| Formulation | I | II | I | I | I | I | II | I |
| Mooney viscosity (ML1 + 4, 100° C.) | 77 | 110 | 73 | 70 | 54 | 62 | 99 | 72 |
| Tensile strength (index) | 102 | 109 | 102 | 103 | 100 | 104 | 107 | 105 |
| 0° C. tanδ (index) | 127 | 131 | 115 | 115 | 100 | 112 | 122 | 108 |
| 70° C. tanδ (index) | 125 | 110 | 134 | 131 | 100 | 114 | 104 | 108 |
| Wear resistance (index) | 104 | 107 | 111 | 113 | 100 | 105 | 106 | 103 |

As apparent from Table 4, it can be known that the crosslinked rubber compositions of the present invention, which were obtained from modified conjugated-diene rubbers of the present invention, have a remarkably improved balance between wet skid resistance and low-hysteresis-loss characteristics with retaining intact tensile strength and wear resistance.

From the results of the evaluation of the properties of modified conjugated-diene rubbers N to P of Comparative Examples 1 to 3, it can be ascertained that both of steps (a) and (b) according to the present invention are important for an improvement in balance between wet skid resistance and low-hysteresis-loss characteristics.

From the results of the evaluation of the properties of modified conjugated-diene rubber Q of Comparative Example 4, it can be ascertained that to modify the conjugated-diene polymer in step (a) using an alkoxysilane compound having a group capable of becoming an onium is important for an improvement in balance between wet skid resistance and low-hysteresis-loss characteristics.

The invention claimed is:

1. A method for producing a modified conjugated diene rubber, the method comprising:
   (a) reacting a conjugated diene polymer comprising an alkali metal or alkaline earth metal active end with a first alkoxysilane compound comprising: an alkoxysilyl group comprising two or more alkoxy groups; and a group protected by a protecting group and capable of being deprotected, to obtain a modified conjugated-diene polymer comprising a first alkoxysilyl group; and
   (b) reacting the modified conjugated-diene polymer comprising the first alkoxysilyl group with a second alkoxysilane compound comprising a second alkoxysilyl group in the presence of a condensation catalyst comprising a metallic element,
   to form a modified conjugated-diene rubber,
   wherein the conjugated diene polymer is obtained by polymerizing a conjugated diene compound or by polymerizing a conjugated diene compound with an aromatic vinyl compound.

2. The method according to claim 1, wherein the group protected by a protecting group is at least one selected from the group consisting of
   a nitrogen-containing group in which two hydrogen atoms of a primary amine have been replaced by two protecting groups,
   a nitrogen-containing group in which one hydrogen atom of a secondary amine has been replaced by one protecting group,
   a sulfur-containing group in which one hydrogen atom of a thiol has been replaced by one protecting group,
   a phosphorus-containing group in which two hydrogen atoms of a primary phosphine have been replaced by two protecting groups, and
   a phosphorus-containing group in which one hydrogen atom of a secondary phosphine has been replaced by one protecting group.

3. The method according to claim 1, wherein the condensation catalyst is a metal compound comprising at least one metallic element within Group 4, Group 12, Group 13, Group 14, and Group 15 of the periodic table.

4. The method according to claim 3, wherein the condensation catalyst is an alkoxide, carboxylic acid salt, or acetylacetonato complex salt of the metallic element.

5. The method according to claim 1, further comprising:
   (c) contacting water with a mixture obtained by the reacting (b).

6. A modified conjugated diene rubber obtained by the method according to claim 1.

7. A rubber composition, comprising the modified conjugated diene rubber of claim 6, silica and/or carbon black, and a crosslinking agent.

8. A crosslinked rubber composition obtained by crosslinking the rubber composition according to claim 7.

9. A tire, comprising the crosslinked rubber composition according to claim 8.

10. The method according to claim 2, further comprising:
   (c) contacting water with a mixture obtained by the reacting (b).

11. A modified conjugated diene rubber obtained by the method according to claim 2.

12. A rubber composition, comprising the modified conjugated diene rubber of claim 11, silica and/or carbon black, and a crosslinking agent.

13. A crosslinked rubber composition obtained by crosslinking the rubber composition according to claim 12.

14. The method according to claim 1, wherein the protecting group is a group which protects against a reaction with the alkali metal or alkaline earth metal active end of the conjugated diene polymer.

15. The method according to claim 2, wherein the condensation catalyst is a metal compound comprising at least one metallic element within Group 4, Group 12, Group 13, Group 14, and Group 15 of the periodic table.

16. The method according to claim 15, wherein the condensation catalyst is an alkoxide, carboxylic acid salt, or acetylacetonato complex salt of the metallic element.

* * * * *